United States Patent
Zhang et al.

(10) Patent No.: US 12,156,206 B2
(45) Date of Patent: Nov. 26, 2024

(54) METHOD AND APPARATUS FOR TRANSMITTING CONTROL SIGNALING

(71) Applicant: Samsung Electronics Co., Ltd., Suwon-si (KR)

(72) Inventors: Sa Zhang, Beijing (CN); Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 17/594,249

(22) PCT Filed: Dec. 29, 2020

(86) PCT No.: PCT/KR2020/019245
§ 371 (c)(1),
(2) Date: Oct. 7, 2021

(87) PCT Pub. No.: WO2021/137564
PCT Pub. Date: Jul. 8, 2021

(65) Prior Publication Data
US 2022/0201724 A1 Jun. 23, 2022

(30) Foreign Application Priority Data

Dec. 30, 2019 (CN) .......................... 201911401280.6
Feb. 27, 2020 (CN) .......................... 202010125873.0
(Continued)

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS 10,341,057 B2 * 7/2019 Shen .......................... H04L 1/18
2013/0301490 A1 11/2013 He et al.
(Continued)

FOREIGN PATENT DOCUMENTS

CA 3022244 A1 4/2019
CN 104521304 A 4/2015
(Continued)

OTHER PUBLICATIONS

International Search Report and Written Opinion of the International Searching Authority dated Mar. 26, 2021 in connection with International Application No. PCT/KR2020/019245, 10 pages.
(Continued)

*Primary Examiner* — Clemence S Han

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services.
A method performed by a second type of transceiver node in a wireless communication system is provided, comprising:
(Continued)

receiving a first type of data and/or a first type of control signaling from a first type of transceiver node; determining an HARQ-ACK codebook and a time unit for transmitting the HARQ-ACK codebook based on the first type of data and/or the first type of control signaling; and transmitting the HARQ-ACK codebook to the first type of transceiver node in the determined time unit.

20 Claims, 6 Drawing Sheets

(30) Foreign Application Priority Data

| | | |
|---|---|---|
| Mar. 27, 2020 | (CN) | 202010228460.5 |
| Apr. 17, 2020 | (CN) | 202010307465.7 |
| May 13, 2020 | (CN) | 202010402924.X |
| Aug. 17, 2020 | (CN) | 202010828101.3 |
| Aug. 19, 2020 | (CN) | 202010839894.9 |

(51) Int. Cl.
*H04L 5/00* (2006.01)
*H04L 5/14* (2006.01)
*H04W 72/0446* (2023.01)
*H04W 72/20* (2023.01)

(52) U.S. Cl.
CPC ....... *H04L 5/1469* (2013.01); *H04W 72/0446* (2013.01); *H04W 72/20* (2023.01)

(56) References Cited

U.S. PATENT DOCUMENTS

| | | | |
|---|---|---|---|
| 2013/0336160 A1 | 12/2013 | Yin et al. | |
| 2015/0085714 A1 | 3/2015 | Liang et al. | |
| 2018/0019843 A1* | 1/2018 | Papasakellariou | H04L 1/1854 |
| 2019/0268803 A1* | 8/2019 | He | H04W 28/04 |
| 2021/0344448 A1* | 11/2021 | Nogami | H04L 5/0055 |
| 2022/0095337 A1* | 3/2022 | Wang | H04L 5/0055 |
| 2022/0278807 A1* | 9/2022 | Zhang | H04L 1/1864 |
| 2022/0330297 A1* | 10/2022 | Lei | H04L 5/0055 |

FOREIGN PATENT DOCUMENTS

| | | |
|---|---|---|
| CN | 108633070 A | 10/2018 |
| CN | 110351027 A | 10/2019 |
| KR | 10-2019-0099366 A | 8/2019 |
| WO | 2012088874 A1 | 7/2012 |

OTHER PUBLICATIONS

Caict, "UCI enhancements for URLLC," R1-1905132, 3GPP TSG RAN WG1 Meeting #96bis, Xi'an, China, Apr. 8-12, 2019, 6, pages.
Mediatek Inc., "Multiple HARQ procedures and intra-UE UCI prioritization," R1-1906566, 3GPP TSG RAN WG1 Meeting #97, Reno, Nevada, USA, May 13-17, 2019, 11 pages.
Nokia, et al., "On UCI Enhancements for NR URLLC," R1-1906752, 3GPP TSG RAN WG1#97, Reno, Nevada, US, May 13-17, 2019, 14 pages.
Oppo, "UCI enhancements for URLLC," R1-1906448, 3GPP TSG RAN WG1 #97, Reno, USA, May 13-17, 2019, 8 pages.
Supplementary European Search Report dated Apr. 12, 2022, in connection with European Application No. 20908699.0, 10 pages.
Huawei, et al., "Discussion on semi-static HARQ-ACK codebook when slot aggregation for UCI reliability," R1-1807138, 3GPP TSG RAN WG1 Meeting #93, Busan, Korea, May 21-25, 2018, 8 pages.
Notification of Granting of Patent Right to Invention dated Aug. 30, 2024, in connection with Chinese Application No. 202010839894.9, 9 pages.

* cited by examiner

METHOD AND APPARATUS FOR TRANSMITTING CONTROL SIGNALING

CROSS-REFERENCE TO RELATED APPLICATIONS

This application is a 371 National Stage of International Application No. PCT/KR2020/019245, filed Dec. 29, 2020, which claims priority to Chinese Patent Application No. 201911401280.6, filed Dec. 30, 2019, Chinese Patent Application No. 202010125873.0, filed Feb. 27, 2020, Chinese Patent Application No. 202010228460.5, filed Mar. 27, 2020, Chinese Patent Application No. 202010307465.7, filed Apr. 17, 2020, Chinese Patent Application No. 202010402924.X, filed May 13, 2020, Chinese Patent Application No. 202010828101.3, filed Aug. 17, 2020, and Chinese Patent Application No. 202010839894.9, filed Aug. 19, 2020, the disclosures of which are herein incorporated by reference in their entirety.

BACKGROUND

1. Field

The present disclosure relates to wireless communication technology, and in particular, to a method and an apparatus for transmitting control signaling.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As the rapid development of the information industry, especially a growing demand from the mobile Internet and the internet of things (IoT), an unprecedented challenge has been brought to future mobile communication technologies. According to the report ITU-R M.[IMT.BEYOND 2020.TRAFFIC] of the international telecommunication union (ITU), it can be predicted that by 2020, the growth of mobile traffic will increase by nearly 1,000 times compared with 2010 (a 4G era), and the number of user equipment connections will also exceed 17 billion. As massive IoT devices gradually penetrate into mobile communication networks, the number of connected devices will be even more amazing. In order to deal with this unprecedented challenge, the communication industry and academia have launched extensive research on the 5th-generation mobile communication technology (5G). At present, a framework and an overall objective of the future 5G have already been discussed in the report ITU-R M. [IMT.VISION] of ITU, in which outlook for demands, application scenarios and various important performance indicators of 5G are described in detail. In response to new demands in 5G, ITU's report ITU-R M.[IMT.FUTURE TECHNOLOGY TRENDS] provides information on technology trends of 5G, and aims to address significant issues such as significant improvements in system throughput, consistency of user experience, scalability to support IoT, delay, energy efficiency, cost, network flexibility, support for emerging services, flexible spectrum utilization and the like. In 3GPP, the first phase of work on 5G is already underway.

SUMMARY

In 5G, when the HARQ-ACK delay is variable, even in an FDD system, HARQ-ACK that needs to be fed back in one uplink time unit may come from downlink data of a plurality of downlink time units, the number of downlink time units for which HARQ-ACK needs to be fed back is also variable, and situation of each UE is usually different. Compared with an existing TDD system, since the HARQ-ACK delay is variable, an initial position as well as a length of a bound window of the HARQ-ACK feedback are variable. Moreover, HARQ-ACK feedback based on code block groups (CBGs) may also be used in 5G in addition to the HARQ-ACK feedback scheme with transport blocks (TBs) as granularity in an existing LTE system. When physical downlink shared channels (PDSCHs) of the two HARQ-ACK feedback scheme need to be fed back in a same physical uplink control channel (PUCCH) or physical uplink shared channel (PUSCH), how to design downlink control signaling to enable determination of an HARQ-ACK codebook by a user equipment, and how to design uplink control signaling to carry the HARQ-ACK, are both in urgent need of solutions.

According to an aspect of the present disclosure, a method performed by a second type of transceiver node in a wireless communication system is provided, comprising: receiving a first type of data and/or a first type of control signaling from a first type of transceiver node; determining a hybrid automatic repeat request-acknowledgement (HARQ-ACK) codebook and a time unit for transmitting the HARQ-ACK codebook based on the first type of data and/or the first type of control signaling; and transmitting the HARQ-ACK codebook to the first type of transceiver node in the determined time unit.

And also, according to an aspect of the present disclosure, a second type of transceiver node in a wireless communication system is provided, comprising: a transceiver configured to receive a first type of data and/or a first type of control signaling from a first type of transceiver node and transmit an HARQ-ACK codebook to the first type of transceiver node in a time unit; a controller configured to control an overall operation of the second type of transceiver node, including: determining the HARQ-ACK codebook and the time unit for transmitting the HARQ-ACK codebook based on the first type of data and/or the first type of control signaling; and controlling the transceiver to transmit the HARQ-ACK codebook to the first type of transceiver node in the determined time unit.

And according to an aspect of the present disclosure, a method performed by a first type of transceiver node in a wireless communication system is provided, comprising: transmitting a first type of data and/or a first type of control signaling to a second type of transceiver node; receiving an HARQ-ACK codebook from the second type of transceiver node in a time unit; wherein the HARQ-ACK codebook and the time unit are determined by the second type of transceiver node based on the received first type of data and/or the first type of control signaling.

Also, according to an aspect of the present disclosure, a first type of transceiver node in a wireless communication system is provided, the first type of transceiver node comprising: a transceiver configured to transmit a first type of data and/or a first type of control signaling to a second type of transceiver node, and receive an HARQ-ACK codebook from the second type of transceiver node in a time unit; and a controller configured to control an overall operation of the first type of transceiver node, including: controlling the transceiver to transmit the first type of data and/or the first type of control signaling to the second type of transceiver node and receive the HARQ-ACK codebook from the second type of transceiver node in the time unit; wherein the HARQ-ACK codebook and the time unit are determined by the second type of transceiver node based on the received first type of data and/or the first type of control signaling.

HARQ-ACK feedback based on code block groups (CBGs) may also be used in addition to the HARQ-ACK feedback scheme with transport blocks (TBs) as granularity. When physical downlink shared channels (PDSCHs) of the two HARQ-ACK feedback scheme need to be fed back in a same physical uplink control channel (PUCCH) or physical uplink shared channel (PUSCH), the technical solutions provide how to design downlink control signaling to enable determination of an HARQ-ACK codebook by a user equipment, and how to design uplink control signaling to carry the HARQ-ACK.

BRIEF DESCRIPTION OF THE DRAWINGS

The above and additional aspects and advantages of the present disclosure will become more apparent and easy to understand with the following description in conjunction with the accompanying drawings, in which.

DETAILED DESCRIPTION

Figure 1:
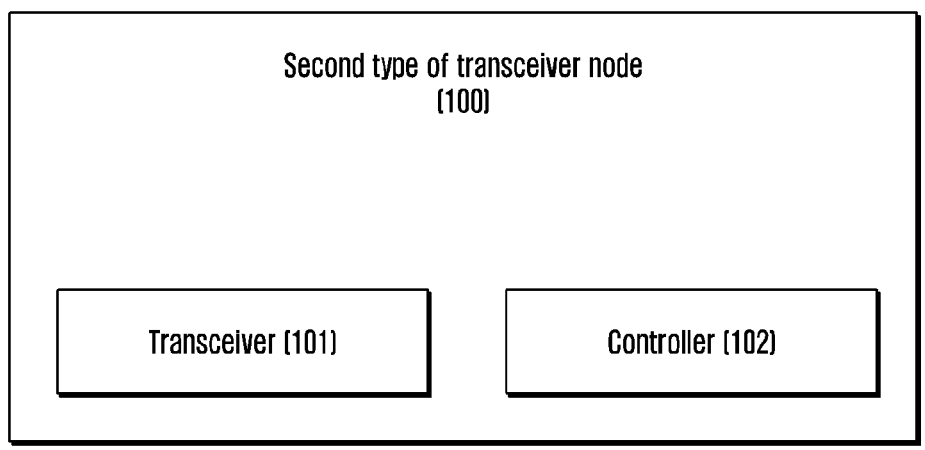
FIG. 1 shows a block diagram of a second type of transceiver node according to an embodiment of the present disclosure.

Embodiments of the present disclosure will be described in detail below. Examples of the embodiments are shown in the accompanying drawings, in which the same or similar reference numerals represent the same or similar elements or elements having the same or similar functions throughout the specification. The embodiments described below with reference to the accompanying drawings are exemplary and only used to explain the present disclosure, and cannot be construed as a limitation on the present disclosure.

Those skilled in the art can understand that singular forms of "a", "an", "said" and "the" used herein may also include plural forms, unless specifically stated. It should be further understood that the word "including", "comprising" used in the specification of the present disclosure refers to the presence of the described features, integers, steps, operations, elements and/or components, but does not exclude the presence or addition of one or more other features, integers, steps, operations, elements, components, and/or groups thereof.

Those skilled in the art can understand that, all terms (including technical terms and scientific terms) used herein have the same meaning as those generally understood by those of ordinary skill in the art to which this disclosure belongs, unless otherwise defined. It should also be understood that terms such as those defined in a general dictionary should be understood to have meanings consistent with those in the context of the prior art, and will not be interpreted with idealized or excessively formal meanings, unless specifically defined as herein.

In order to support more flexible scheduling, 3GPP decided to support variable hybrid automatic repeat request-acknowledgement (HARQ-ACK) feedback delay in 5G. In an existing long term evolution (LTE) system, a time from the reception of downlink data to the uplink transmission of HARQ-ACK is fixed. For example, in a frequency division duplex (FDD) system, the delay is 4 subframes, in a time division duplex (TDD) system, the delay can be greater than 4 subframes. According to uplink and downlink configuration, a HARQ-ACK feedback delay is determined for corresponding downlink subframes. In a 5G system, whether it is an FDD or a TDD system, for a downlink time unit (for example, a downlink slot or a downlink mini-slot), an uplink time unit that can feed back HARQ-ACK is variable. For example, the HARQ-ACK feedback delay may be dynamically indicated through physical layer signaling, or different HARQ-ACK delays may be determined according to factors such as different services or user capabilities.

In 5G, when the HARQ-ACK delay is variable, even in an FDD system, HARQ-ACK that needs to be fed back in one uplink time unit may come from downlink data of a plurality of downlink time units, the number of downlink time units for which HARQ-ACK needs to be fed back is also variable, and situation of each UE is usually different. Compared with an existing TDD system, since the HARQ-ACK delay is variable, an initial position as well as a length of a bound window of the HARQ-ACK feedback are variable. Moreover, HARQ-ACK feedback based on code block groups (CBGs) may also be used in 5G in addition to the HARQ-ACK feedback scheme with transport blocks (TBs) as granularity in an existing LTE system. When physical downlink shared channels (PDSCHs) of the two HARQ-ACK feedback scheme need to be fed back in a same physical uplink control channel (PUCCH) or physical uplink shared channel (PUSCH), how to design downlink control signaling to enable determination of an HARQ-ACK codebook by a user equipment, and how to design uplink control signaling to carry the HARQ-ACK, are both in urgent need of solutions.

According to an aspect of the present disclosure, a method performed by a second type of transceiver node in a wireless communication system is provided, comprising: receiving a first type of data and/or a first type of control signaling from a first type of transceiver node; determining a hybrid automatic repeat request-acknowledgement (HARQ-ACK) codebook and a time unit for transmitting the HARQ-ACK codebook based on the first type of data and/or the first type of control signaling; and transmitting the HARQ-ACK codebook to the first type of transceiver node in the determined time unit.

Optionally, determining the HARQ-ACK codebook further includes converting values of an assignment index field expressed in different numbers of bits in the first type of control signaling in different formats into values expressed in a unified number of bits, and determining the HARQ-ACK codebook based on the values of the converted assignment index field.

Optionally, the unified number of bits is the maximum number of bits or a minimum number of bits among the different numbers of bits expressing the values of the assignment index field.

Optionally, the method further comprises determining a number of information bits of the HARQ-ACK codebook related to power control of a physical uplink control channel (PUCCH) based on a number of bits of an assignment index field received in a last monitoring occasion.

Optionally, the unified number of bits is configured according to standard specifications or higher layer signaling.

Optionally, the unified number of bits is configured to express the maximum number of bits or a minimum number of bits among the different numbers of bits expressing the values of the assignment index field according to the standard specifications or the higher layer signaling.

Optionally, the method further comprises determining a number of information bits of the HARQ-ACK codebook related to power control of the PUCCH based on the unified number of bits configured according to the protocol regulations or the higher layer signaling.

Optionally, the unified number of bits is determined according to a priority of the HARQ-ACK codebook.

Optionally, if the priority of the HARQ-ACK codebook is high, the unified number of bits is determined as a minimum number of bits among the different numbers of bits representing the values of the assignment index field; and if the priority of the HARQ-ACK codebook is low, the unified number of bits is determined as the maximum number of bits among the different numbers of bits representing the values of the assignment index field.

Optionally, determining the HARQ-ACK codebook further includes: determining a set M of assignment index counting occasions corresponding to an HARQ-ACK codebook transmitted in the determined time unit based on the first type of control signaling.

Optionally, in a case where a slot-based repetitive transmission scheme of a physical downlink shared channel (PDSCH) is configured, a first parameter that dynamically indicates a number of PDSCH slot-based repetitions is configured, and the set M of counting occasions is determined according to the first parameter or the maximum value of set of the first parameter.

Optionally, in a case where a slot-based repetitive transmission scheme of a PDSCH is configured, a first parameter that dynamically indicates a number of PDSCH slot-based repetitions and a second parameter that semi-statically configure the number of PDSCH slot-based repetitions are configured, and the set M of counting occasions is determined according to the maximum value of first parameter and maximum values of a set of the second parameter.

Optionally, when the first type of data is grouped and the HARQ-ACK codebook corresponds to more than one group of the first type of data, an HARQ-ACK codebook is generated for each of the more than one group of the first type of data, respectively, and then a total HARQ-ACK codebook is generated.

Optionally, when the first type of data is grouped and the HARQ-ACK codebook corresponds to more than one group of the first type of data, a number of information bits of the HARQ-ACK codebook is determined for each of the more than one group of the first type of data, respectively, and then a total number of information bits of the HARQ-ACK codebook is generated.

Optionally, when the first type of data is grouped and the HARQ-ACK codebook corresponds to more than one group of the first type of data, a set M of assignment index counting occasions corresponding to an HARQ-ACK codebook transmitted in the determined time unit is determined for each of the more than one group of the first type of data, respectively, and then a total HARQ-ACK codebook is generated.

According to an aspect of the present disclosure, a second type of transceiver node in a wireless communication system is provided, comprising: a transceiver configured to receive a first type of data and/or a first type of control signaling from a first type of transceiver node and transmit an HARQ-ACK codebook to the first type of transceiver node in a time unit; a controller configured to control an overall operation of the second type of transceiver node, including: determining the HARQ-ACK codebook and the time unit for transmitting the HARQ-ACK codebook based on the first type of data and/or the first type of control signaling; and controlling the transceiver to transmit the HARQ-ACK codebook to the first type of transceiver node in the determined time unit.

Optionally, the controller controls the second type of transceiver node to perform the method of claims 1-15.

According to an aspect of the present disclosure, a method performed by a first type of transceiver node in a wireless communication system is provided, comprising: transmitting a first type of data and/or a first type of control signaling to a second type of transceiver node; receiving an HARQ-ACK codebook from the second type of transceiver node in a time unit; wherein the HARQ-ACK codebook and the time unit are determined by the second type of transceiver node based on the received first type of data and/or the first type of control signaling.

According to an aspect of the present disclosure, a first type of transceiver node in a wireless communication system is provided, the first type of transceiver node comprising: a transceiver configured to transmit a first type of data and/or a first type of control signaling to a second type of transceiver node, and receive an HARQ-ACK codebook from the second type of transceiver node in a time unit; and a controller configured to control an overall operation of the first type of transceiver node, including: controlling the transceiver to transmit the first type of data and/or the first type of control signaling to the second type of transceiver node and receive the HARQ-ACK codebook from the second type of transceiver node in the time unit; wherein the HARQ-ACK codebook and the time unit are determined by the second type of transceiver node based on the received first type of data and/or the first type of control signaling.

Various embodiments of the present disclosure will be described below in detail with reference to the drawings.

FIG. 1 shows a block diagram of a second type of transceiver node according to an embodiment of the present disclosure.

Referring to FIG. 1, the second type of transceiver node 100 may include a transceiver 101 and a controller 102.

The transceiver 101 may be configured to receive a first type of data and/or a first type of control signaling from a first type of transceiver node and transmit an HARQ-ACK codebook to the first type of transceiver node in a determined time unit.

The controller 102 may be a circuit-specific integrated circuit or at least one processor. The controller 102 may be configured to control an overall operation of the second type of transceiver node, and control the second type of transceiver node to implement the method proposed in the present disclosure. In particular, the controller 102 may be configured to determine the HARQ-ACK codebook and the time unit for transmitting the HARQ-ACK codebook based on the first type of data and/or the first type of control signaling, and control the transceiver 101 to transmit the HARQ-ACK codebook to the first type of transceiver node in the determined time unit.

By determining the HARQ-ACK codebook and the time unit for transmitting the HARQ-ACK codebook based on the first type of data and/or the first type of control signaling, it can ensure that the HARQ-ACK codebook is encoded and decoded according to a unified rule, thereby improving reliability of the HARQ-ACK codebook.

In the present disclosure, the first type of transceiver node may be a BS (base station), and the second type of transceiver node may be a UE (user equipment). In the following examples, a BS is taken as an example (but not limited thereto) to describe the first type of transceiver node, and a UE is taken as an example (but not limited thereto) to describe the second type of transceiver node.

The first type of data may be data transmitted by the first type of transceiver node to the second type of transceiver node. In the following examples, downlink data carried by the PDSCH (physical downlink shared channel) is taken as an example (but not limited thereto) to describe the first type of data.

The first type of control signaling may be control signaling transmitted by the first type of transceiver node to the second type of transceiver node. In the following examples, downlink control signaling is taken as an example (but not limited thereto) to describe the first type of control signaling. The downlink control signaling may be DCI (downlink control information) carried by the PDCCH (physical downlink control channel) and/or control signaling carried by the PDSCH (physical downlink shared channel).

The HARQ-ACK codebook may be included in the second type of control signaling. The second type of control signaling may be control signaling transmitted by the second type of transceiver node to the first type of transceiver node. In the following examples, uplink control signaling is taken as an example (but not limited thereto) to describe the second type of control signaling. The uplink control signaling may be UCI (uplink control information) carried by the PUCCH (physical uplink control channel) and/or control signaling carried by the PUSCH (physical uplink shared channel). The UCI may include the HARQ-ACK codebook.

The time unit is a time unit for which the second type of transceiver node transmits the HARQ-ACK codebook. In the following examples, an uplink time unit is taken as an example (but not limited thereto) to describe the time unit.

The time unit may be one or more slots, one or more sub-slots, one or more OFDM (orthogonal frequency division multiplexing) symbols, and one or more sub-frames.

Depending on a network type, the term "base station" or "BS" may refer to any component (or set of components) configured to provide wireless access to the network, such as a transmission point (TP), a transmission-reception point (TRP), an enhanced base station (eNodeB or eNB), a 5G base station (gNB), a macro cell, a femto cell, a WiFi access point (AP) or other wirelessly enabled devices. The Base station may provide wireless access based on one or more wireless communication standard specifications, for example, 5G 3GPP new radio interface/access (NR), long term evolution (LTE), advanced LTE (LTE-A), high speed packet access (HSPA), Wi-Fi 802.11a/b/g/n/ac, etc. For convenience, the terms "BS" and "TRP" may be used interchangeably in this patent document to refer to network infrastructure components that provide wireless access to remote terminals. In addition, depending on the network type, the term "user equipment" or "UE" may refer to any of the following components, such as a "mobile station", a "subscriber station", a "remote terminal", a "wireless terminal", a "reception point", a "user equipment" or simply a "terminal". For convenience, the term "user equipment" or "UE" is used in this patent document to refer to a remote wireless device that wirelessly accesses the BS, whether the UE is a mobile device (such as a mobile phone or a smart phone), or a generally considered fixed equipment (for example, a desktop computer or a vending machine).

Figure 2:
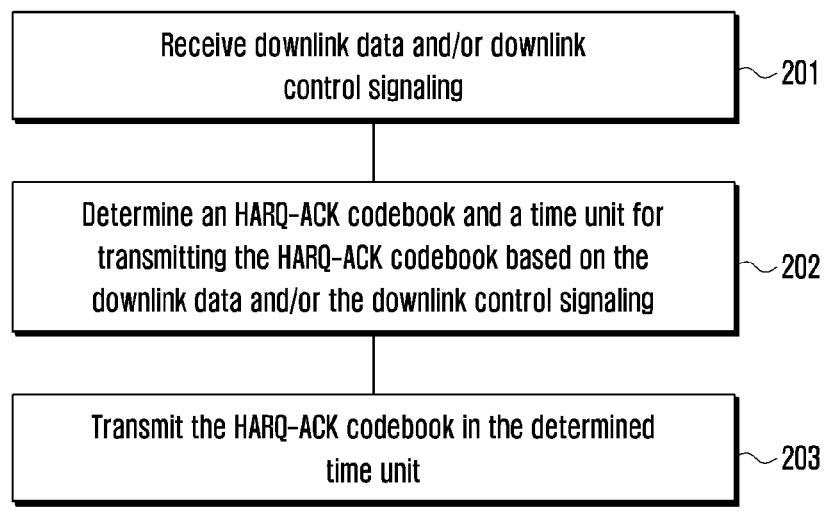
FIG. 2 shows a flowchart of a method performed by UE according to an embodiment of the present disclosure.

FIG. 2 shows a flowchart of a method performed by UE according to an embodiment of the present disclosure.

First, in step 201, UE receives downlink data and/or downlink control signaling from the BS.

At step 202, UE determines an HARQ-ACK codebook and an uplink time unit for transmitting the HARQ-ACK codebook based on the downlink data and/or the downlink control signaling.

Optionally, the uplink time unit for transmitting the HARQ-ACK codebook may be determined according to HARQ-ACK timing information included in the downlink control signaling, and the HARQ-ACK timing information may be configured by dynamic indication and/or high layer signaling.

At step 203, the UE transmits the HARQ-ACK codebook to the BS in the determined uplink time unit.

By determining the HARQ-ACK codebook and the uplink time unit for transmitting the HARQ-ACK codebook based on the downlink data and/or the downlink control signaling, it can ensure that the HARQ-ACK codebook is encoded and decoded according to a unified rule, thereby improving reliability of the HARQ-ACK codebook.

In the present disclosure, an assignment index could be DAI (downlink assignment index). In the following examples, DAI is taken as an example (but not limited thereto) to describe the assignment index.

According to an embodiment of the present disclosure, in the above step 202, the UE can further determine, based on the downlink control signaling, a set M of DAI counting occasions corresponding to an HARQ-ACK codebook transmitted in the uplink time unit, the DAI could be a field included in the DCI.

The DAI counting occasions could be PDCCH monitoring occasions. In the following examples, the PDCCH monitoring occasions are taken as an example (but not limited thereto) to describe the DAI counting occasions.

In the case that a slot-based repetitive transmission scheme of the PDSCH is configured, a parameter that dynamically indicates the number of PDSCH slot-based repetitions may be configured, so that the set M of the counting occasions is determined according to this parameter.

In particular, in one implementation, for a PDCCH scheduling PDSCH and/or indicating SPS (semi-persistent scheduling) PDSCH release on a downlink active BWP (bandwidth part) on a serving cell, a set Mc of PDCCH monitoring occasions corresponding to an HARQ-ACK codebook transmitted in the uplink time unit n determined in step 202 may be based on the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI. This parameter is used to indicate a downlink time unit offset between PDCCH and PDSCH.

pdsch-AggregationFactor: this parameter is a configurable parameter that is used to semi-statically configure the number of PDSCH slot-based repetitions. Optionally, if pdsch-AggregationFactor is not configured, pdsch-AggregationFactor is defaulted as 1.

RepNumR16: this parameter is a configurable parameter that is used to dynamically indicate the number of PDSCH slot-based repetitions. This parameter is indicated by a time-domain resource assignment field in DCI. Optionally, if the slot-based repetitive transmission scheme of PDSCH is not configured or RepNumR16 is not configured, RepNumR16 is defaulted as 1.

In another implementation, for a PDCCH scheduling PDSCH and/or indicating SPS PDSCH release on an active downlink BWP on a serving cell, the set M, of PDCCH monitoring occasions corresponding to an HARQ-ACK codebook transmitted in the uplink time unit n determined in step 202 may be based on the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI. This parameter is used to indicate a downlink time unit offset between PDCCH and PDSCH.

Max {pdsch-AggregationFactor, max{RepNumR16}}: the function max{ } represents an operation of taking the maximum value. pdsch-AggregationFactor is a configurable parameter that is used to semi-statically configure the number of PDSCH slot-based repetitions. Optionally, if pdsch-AggregationFactor is not configured, pdsch-AggregationFactor is defaulted as 1. RepNumR16 is a configurable parameter that is used to dynamically indicate the number of PDSCH slot-based repetitions. This parameter is indicated by a time-domain resource assignment field in DCI. Optionally, if the slot-based repetitive transmission scheme of PDSCH is not configured or RepNumR16 is not configured, RepNumR16 is defaulted as 1.

In another implementation, for a PDCCH scheduling PDSCH and/or indicating SPS PDSCH release on an active downlink BWP on a serving cell, the set M, of PDCCH monitoring occasions corresponding to an HARQ-ACK codebook transmitted in the uplink time unit n determined in step 202 may be based on the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI. This parameter is used to indicate a downlink time unit offset between PDCCH and PDSCH.

pdsch-AggregationFactor: this parameter is a configurable parameter that is used to semi-statically configure the number of PDSCH slot-based repetitions. Optionally, if pdsch-AggregationFactor is not configured, pdsch-AggregationFactor is defaulted as 1.

max{RepNumR16}: RepNumR16 is a configurable parameter that is used to dynamically indicate the number of PDSCH slot-based repetitions. This parameter is indicated by a time-domain resource assignment field in DCI. Optionally, if the slot-based repetitive transmission scheme of PDSCH is not configured or RepNumR16 is not configured, RepNumR16 is defaulted as 1.

In another implementation, for a PDCCH scheduling PDSCH and/or indicating SPS PDSCH release on an active downlink BWP on a serving cell, the set M, of PDCCH monitoring occasions corresponding to an HARQ-ACK codebook transmitted in the uplink time unit n determined in step 202 may be based on the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI. This parameter is used to indicate a downlink time unit offset between PDCCH and PDSCH.

pdsch-AggregationFactor: this parameter is a configurable parameter that is used to semi-statically configure the number of PDSCH slot-based repetitions. Optionally, if pdsch-AggregationFactor is not configured, pdsch-AggregationFactor is defaulted as 1.

RepNumR16 value in a DCI received by the UE: this parameter is a configurable parameter that is used to dynamically indicate the number of PDSCH slot-based repetitions. This parameter is indicated by a time-domain resource assignment field in DCI. Optionally, if the slot-based repetitive transmission scheme of PDSCH is not configured or RepNumR16 is not configured, RepNumR16 is defaulted as 1.

It should be noted that RepNumR16 is configured in a time-domain resource assignment table by high layer signaling, and RepNumR16 is an optional configuration. If a row in the time-domain resource assignment table indicated by the time-domain resource assignment field in DCI includes the parameter RepNumR16, PDSCH should be transmitted repeatedly in RepNumR16 slots.

This method specifies relevant parameters for determining the set $M_c$ of PDCCH monitoring occasions corresponding to an HARQ-ACK codebook, which ensures a consistent understanding for the set Mc of PDCCH monitoring occasions corresponding to an HARQ-ACK codebook between the UE and the base station when the DCI dynamically indicates repetitive transmission of PDSCH, thereby further ensuring a consistent understanding of a size and an ordering of the HARQ-ACK codebook between the UE and the base station, and improving reliability of the HARQ-ACK codebook.

In another embodiment, optionally, the UE is provided one or more activated SPS PDSCH configurations in a serving cell c. Optionally, a SPS PDSCH configuration i may be configured with the number of PDSCH slot-based repetitions, pdsch-AggregationFactor, in SPS-Config. The number of PDSCH slot-based repetitions, pdsch-AggregationFactor, configured in SPS-Config for different SPS PDSCH configurations may be the same or different. When a SPS PDSCH configuration i is activated by a DCI format, for example, DCI format 1_2 or DCI format 1_1, and if the SPS PDSCH configuration i is configured with the number of PDSCH slot-based repetitions, pdsch-AggregationFactor, in SPS-Config, then the number of PDSCH slot-based repetitions of the SPS PDSCH configuration i is the number of PDSCH slot-based repetitions, pdsch-AggregationFactor, configured in SPS-Config, otherwise the number of PDSCH slot-based repetitions of the SPS PDSCH configuration i is the number of PDSCH slot-based repetitions, pdsch-AggregationFactor, configured in PDSCH-Config. pdsch-AggregationFactor in PDSCH-Config may be configured as 2, 4 or 8, and if not configured, pdsch-AggregationFactor is equal to 1 by default. pdsch-AggregationFactor in SPS-Config may be configured as 1, 2, 4 or 8.

The UE may receive DCI format 1_0, and/or DCI format 1_1, and/or DCI format 1_2. A value range of K1 in different DCI formats may be different, where K1 is a time interval between the PDSCH and the PUCCH (a PDSCH-to-HARQ_feedback timing indicator). The unit of K1 may be a slot or a sub-slot. The value of K1 in DCI format 1_0 may be 1, 2, 3, 4, 5, 6, 7 or 8. The value of K1 in DCI format 10 may be configured by dl-DataToUL-ACK. The value of K1 in DCI format 1_0 may be configured by dl-DataToUL-ACK-ForDCIFormat1_2. A value range of K0 in different DCI formats may be different, where K0 is a time interval between PDSCH and PDCCH. The unit of K0 may be a slot or a sub-slot. K0 is indicated by a time-domain resource assignment field in DCI.

SCSs (sub-carrier-spacings) of PDCCH, and/or PDSCH, and/or PUCCH may be different or the same.

CPs (cyclic prefixes) of PDCCH, and/or PDSCH, and/or PUCCH may be different or the same.

The UE may be provided the parameter RepNumR16, which is a configurable parameter, and is used to dynamically indicate the number of PDSCH slot-based repetitions. This parameter is indicated by a time-domain resource assignment field in DCI.

An uplink sub-slot configuration of the UE may be that 7 sub-slots are included in one slot, and each sub-slot includes 2 OFDM symbols. The uplink sub-slot configuration of the UE may also be that 2 sub-slots are included in one slot, and each sub-slot includes 7 OFDM symbols.

For a PDCCH scheduling PDSCH and/or indicating SPS PDSCH release on an active downlink BWP on a serving cell, the set Mc of PDCCH monitoring occasions corresponding to an HARQ-ACK codebook transmitted in the uplink time unit n can be based on at least one of the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI format 1_0, and/or DCI format 1_1, and/or DCI format 1_2. This parameter is used to indicate a downlink time unit offset between PDCCH and PDSCH.

pdsch-AggregationFactor: this parameter can be configured in SPS-Config or PDSCH-Config.

the maximum value of pdsch-AggregationFactor: this parameter can be configured in SPS-Config or PDSCH-Config. Optionally, this maximum value can be specified by standard specifications as, for example, 8.

RepNumR16: this parameter is a configurable parameter that is used to dynamically indicate the number of PDSCH slot-based repetitions. This parameter is indicated by a time-domain resource assignment field in DCI format 1_0, and/or DCI format 1_1, and/or DCI format 1_2. Optionally, if the slot-based repetitive transmission scheme of PDSCH is not configured or RepNumR16 is not configured, RepNumR16 is defaulted as 1.

SCSs of PDCCH, and/or PDSCH, and/or PUCCH.

an uplink sub-slot configuration of the UE.

CP configurations of PDCCH, and/or PDSCH, and/or PUCCH.

According to the above method, a specific embodiment may be that, for a PDCCH scheduling PDSCH and/or indicating SPS PDSCH release on an active downlink BWP on a serving cell, the set Mc of PDCCH monitoring occasions corresponding to an HARQ-ACK codebook transmitted in the uplink time unit n may be based on the following parameters:

PDSCH-to-HARQ_feedback values: this parameter is used to indicate an uplink time unit offset from PDSCH reception and/or SPS PDSCH release to a PUCCH of the uplink time unit n in which the HARQ-ACK codebook is transmitted.

slot offsets $K_0$: this parameter $K_0$ is indicated by a time-domain resource assignment field in DCI. This parameter is used to indicate a downlink time unit offset between PDCCH and PDSCH.

pdsch-AggregationFactor: this parameter can be configured in SPS-Config or PDSCH-Config.

RepNumR16: this parameter is a configurable parameter that is used to dynamically indicate the number of PDSCH slot-based repetitions. This parameter is indicated by a time-domain resource assignment field in DCI. Optionally, if the slot-based repetitive transmission scheme of PDSCH is not configured or RepNumR16 is not configured, RepNumR16 is defaulted as 1.

It should be noted that the uplink time unit in this embodiment may be an uplink slot and/or an uplink sub-slot.

This method provides relevant parameters for determining the set Mc of PDCCH monitoring occasions corresponding to an HARQ-ACK codebook, which ensures a consistent understanding of the set Mc of PDCCH monitoring occasions corresponding to an HARQ-ACK codebook between the UE and the base station when DCI dynamically indicates repetitive transmission of PDSCH, and/or different parameter pdsch-AggregationFactor are configured for different SPS configurations, and SCSs of PDCCH, PDSCH and PUCCH are different, thereby further ensuring a consistent understanding of a size and an ordering of the HARQ-ACK codebook between the UE and the base station, and improving reliability of the HARQ-ACK codebook.

In another embodiment, for a PDCCH scheduling PDSCH and/or indicating SPS PDSCH release on an active downlink BWP on a serving cell, the slots, at which PDCCH monitoring occasions corresponding to an HARQ-ACK codebook transmitted in the uplink time unit n are located, may be Nmax consecutive slots, and Nmax may be configured by higher layer signaling and/or provided by standard specifications. Nmax may be a specific value, or may be determined by the value of PDSCH-to-HARQ_feedback, and/or the value of the slot offset K0, and/or the value of pdsch-AggregationFactor, and/or the value of RepNumR16, and/or SCS of PDCCH, and/or SCS of PDSCH, and/or SCS of PUCCH. In particular, when SCSs of PDCCH, PDSCH and PUCCH are the same, the slots at which the PDCCH monitoring occasions corresponding to an HARQ-ACK codebook transmitted in uplink time unit n are located may be a downlink slot n-Nmax+1, ..., n. The slots at which the PDCCH monitoring occasions corresponding to an HARQ-ACK codebook transmitted in the uplink time unit n are located may also be a downlink slot n-Nmax, ..., n-1.

This method employs a simple manner to determine the set of PDCCH monitoring occasions, which ensures a consistent understanding of the set Mc of PDCCH monitoring occasions corresponding to an HARQ-ACK codebook between the UE and the base station, thereby further ensuring a consistent understanding of a size and an ordering of the HARQ-ACK codebook between the UE and the base station, and improving reliability of the HARQ-ACK codebook It should be noted that, when the number of serving cells is greater than 1, the set M of PDCCH monitoring occasions corresponding to an HARQ-ACK codebook transmitted in the uplink time unit n is a union of sets Mc of PDCCH monitoring occasions corresponding to HARQ-ACK codebooks transmitted by respective serving cells in the uplink time unit n.

A HARQ-ACK codebook transmitted in a same uplink time unit may be determined according to a downlink assignment index field included in downlink control signaling carried by the downlink physical control channel. The downlink control signaling may be DCI, and the downlink assignment index may be DAI. A DAI field includes at least one of a first type of DAI and a second type of DAI. The first type of DAI may be C-DAI (counter-DAI). The first type of DAI may indicate the following information: a relative sequence of a PDSCH and/or a SPS PDSCH release in the currently scheduled downlink time unit among PDSCHs and/or SPS PDSCHs release of all scheduled downlink time units corresponding to the uplink time unit, bit positions of HARQ-ACK bits of a PDSCH and/or a SPS PDSCH release in the currently scheduled downlink time unit in the HARQ-ACK codebook. The second type of DAI may be T-DAI (total-DAI). The second type of DAI may indicate a total number of all scheduled PDSCHs and/or SPS PDSCH releases corresponding to the uplink time unit. In following examples, C-DAI is taken as an example (but not limited thereto) to describe the first type of DAI, and T-DAI is taken as an example (but not limited thereto) to describe the second type of DAI.

The number of bits for C-DAI and T-DAI is limited. For example, when C-DAI or T-DAI is represented by 2 bits, C-DAI or T-DAI greater than 4 may be represented by the equation in Table 1. Table 1 shows a correspondence relationship between the DAI field and $V_{T-DAI,m}$ or $V_{C-DAI,c,m}$. $V_{T-DAI,m}$ is the value of T-DAI in DCI received in PDCCH monitoring occasion m, and $V_{C-DAI,c,m}$ is the value of C-DAI in DCI about the serving cell c received in PDCCH monitoring occasion m. $V_{T-DAI,m}$ and $V_{C-DAI,c,m}$ are both related to the number of bits of the DAI field in DCI. MSB is the most significant bit, and LSB is the least significant bit.

TABLE 1

| DAI MSB, LSB | $V_{T-DAT,m}$ or $V_{C-DAI,c,m}$ | Y |
| --- | --- | --- |
| 0, 0 | 1 | (Y − 1)mod 4 + 1 = 1 |
| 0, 1 | 2 | (Y − 1)mod 4 + 1 = 2 |
| 1, 0 | 3 | (Y − 1)mod 4 + 1 = 3 |
| 1, 1 | 4 | (Y − 1)mod 4 + 1 = 4 |

When C-DAI or T-DAI is 1, 5 or 9, they are all indicated by "00" in DAI field, as shown in Table 1, and the value of $V_{T-DAI,m}$ or $V_{C-DAI,c,m}$. $V_{T-DAI,m}$ is expressed as "1" by the equation in Table 1. Y represents the number of DCI actually transmitted by the BS.

In the case where C-DAI or T-DAI in DCI is 1 bit, values greater than 2 may be expressed by the equation in Table 2.

TABLE 2

| DAI | $V_{T-DAT,m}$ or $V_{C-DAI,c,m}$ | Y |
| --- | --- | --- |
| 0 | 1 | (Y − 1)mod 2 + 1 = 1 |
| 1 | 2 | (Y − 1)mod 2 + 1 = 2 |

When the number of bits representing C-DAI or T-DAI in different DCI formats is different, a consistent understanding of DAI information between the base station and the UE cannot be guaranteed. Therefore, it is necessary to unify different numbers of bits and then generate the HARQ-ACK codebook.

According to an embodiment of the present disclosure, the above operation of determining the HARQ-ACK codebook in step 203 of FIG. 2 may further include an operation of converting values of DAI represented by different numbers of bits in different formats of DCI into values represented by a unified number of bits, and determining the HARQ-ACK codebook based on the converted values of DAI.

Figure 3:
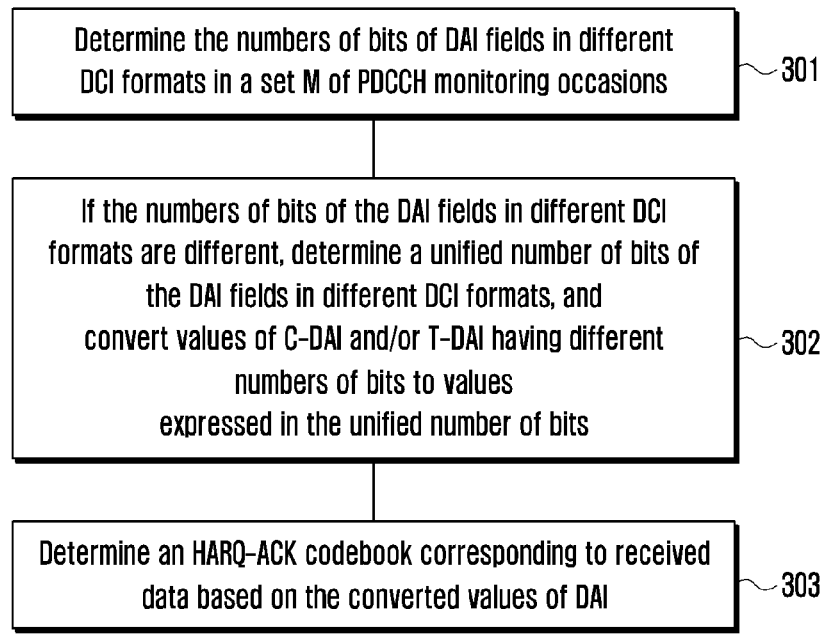
FIG. 3 shows a flowchart of converting values of DAIs represented by different numbers of bits in control signaling in different formats into values represented by a unified number of bits according to an embodiment of the present disclosure.

FIG. 3 shows a flowchart of converting values of DAI represented by different numbers of bits in control signaling in different formats into values represented by a unified number of bits according to an embodiment of the present disclosure In step 301, the numbers of bits of respective DAI fields in different DCI formats in the set M of PDCCH monitoring occasions are determined, that is, the numbers of bits of C-DAI and/or T-DAI are determined.

In step 302, if the numbers of bits of respective DAI fields in different DCI formats are different, a unified number of bits of the DAI fields in different DCI formats is determined, and C-DAI and/or T-DAI with different numbers of bits will be converted into values indicated by the unified number of bits.

In step 303, the HARQ-ACK codebook is determined based on the converted DAI values.

By determining the HARQ-ACK codebook after unifying the number of bits for C-DAI or T-DAI in different DCI formats, it is possible to guarantee a consistent understanding of the DAI information between the BS and the UE, ensure that encoding and decoding of the HARQ-ACK codebook are carried out according to a unified rule, and improve reliability of the HARQ-ACK codebook.

According to an embodiment of the present disclosure, in the above step 302, the unified number of bits could be set to the maximum number of bits among different numbers of bits representing the values of DAI, that is, values of C-DAI or T-DAI represented by different numbers of bits are converted into values expressed by the maximum number of bits among the different numbers of bits. For example, the different numbers of bits indicating the values of C-DAI or T-DAI include the number of bits N1 (e.g., 1 bit) and the number of bit N2 (e.g., 2 bits). When the number of bits is N1, the number of DAI values that may be indicated is $T1=2^{N1}$; and when the number of bits is N2, the number of DAI values that may be indicated $T2=2^{N2}$. When the number of bits Nx of the DAI field is less than N2, a range that may be indicated by the DAI field is an integer within the range [1, 2Nx]. For example, when N2=2, the number of bits of the DAI field is 2, the value of the DAI is indicated according to Table 1, and as shown in Table 1, the range that may be indicated by the DAI field is 1, 2, 3, 4. When N1=1, the number of bits of the DAI field is 1, the value of the DAI is indicated according to Table 2, and the range that may be indicated by the DAI field is 1,2.

In addition, it should be noted that the method in the present embodiment is directed to the HARQ-ACK codebook generated at one same uplink time unit, and all parameters are assumed to satisfy this assumption by default unless specially specified.

In this embodiment, the value of DAI indicated by the number of bits N1 is converted into the value of DAI indicated by the number of bits N2 according to the following pseudo-code 1, and a total number of $O_{ACK}$ information bits $\tilde{o}_0^{ACK}, \tilde{o}_1^{ACK}, \ldots, \tilde{o}_{O^{ACK}-1}^{ACK}$ included in the HARQ-ACK codebook are determined based on the converted value of DAI. In the process of converting the DAI value indicated by the number of N1 bits into the DAI value indicated by the N2 bits, the number of PDCCH (or DCI) actually received by the UE also needs to be considered. In this embodiment, one PDSCH corresponds to 1-bit HARQ-ACK information, where $T=2^{N2}$.

---

Pseudo-code 1:

```
Set m = 0         - index corresponds to PDCCH monitoring occasion
Set j = 0
Set k = 0
Set V1 = 0
Set V2 = 0
Set V3 = 0
Set V_s = Ø
Set N_cells to the number of serving cells configured for the UE
Set M to the number of PDCCH monitoring occasion(s)
while m < M
    c = 0         - serving cell index
    while c < N_cells^DL
    if PDCCH monitoring occasion m is before a BWP (Bandwidth Part)
    change on serving cell c
        c = c+1;
    else
        if there is a PDCCH that schedules PDSCH on one serving cell c or in-
        dicates SPS
        PDSCH release on serving cell c in PDCCH monitoring occasion m
        if the number of bits of the DCI field in the current DCI format is N1
            if V_C-DAI,c,m ≤ V3
                k = (k + 1) mod 2^(N2-N1)
            end if
            V3 = V_C-DAI,c,m
            V_C-DAI,c, m = V_C-DAI,c, m + k · 2^N1
        else
            if ( V_C-DAI,c,m − 1) mod 2^(N2-N1) + 1 ≤ V3
                k = (k + 1) mod 2^(N2-N1)
            end if
            V3 = ( V_C-DAI,c,m − 1) mod 2^(N2-N1) + 1
        end if
        if V_C-DAI,c,m ≤ V1
            j = j+1
        end if
        V1 = V_C-DAIc,m
        if V_T-DAI,m = Ø
                V2 = V_C-DAI,c,m
            else
                V2 = V_T-DAI,m
            end if
        õ_{T2·j+V_C-DAI,c,m−1}^{ACK} = HARQ-ACK information
        V_S = V_S ∪ {T2 · j + V_C-DAI ,c,m − 1}
        end if
        c = c+1
    end if
    end while
    m = m+1
end while
if V2 < V1
    j = j+1
end if
O^ACK = T2 · j + V2
õ_i^ACK = NACK for any i ∈ {0,1,...,O^ACK −1}\V_s
end while
```

In the above pseudo-code 1, the parameter k is updated according to the number of PDCCH (or DCI) actually received by the UE, and the DAI value indicated by the N1 bits is converted into the DAI value indicated by the N2 bits according to the parameter k and the DAI indicated in the DCI. The parameter V3 is used to indicate the C-DAI value indicated by the number of bits N1 at the end of a previous cycle. For example, when N1 is 1 and N2 is 2, for DAI indicated by N1 bits: when k=0, a 1-bit DAI may indicate 1, 2, 5, 6 . . . ; when k=1, a 1-bit DAI may indicate 3, 4, 7, 8 . . . .

For DAI indicated by N2 bits, the UE also needs to determine an actual value of DAI according to the number of PDCCH (or DCI) actually received by the UE. In pseudo-code 1, the parameter j is updated according to the number of PDCCH (or DCI) actually received by the UE, and the actual DAI value is determined according to the parameter j and the DAI indicated in the DCI. The parameter V1 is used to indicate the C-DAI value indicated by the number of bits N2 at the end of a previous cycle.

In particular, assume that there is one serving cell in this embodiment. C-DAI in DCI format one received by the UE is 2 bits, a C-DAI field in DCI format two is 1 bit, and neither DCI format one nor DCI format two has a T-DAI field. DCI format one may be DCI format 1_0/1_1/1_2, and DCI format two may be DCI format 1_0/1_1/1_2. There is no BWP switching in this embodiment. For a HARQ-ACK codebook fed back in the uplink time unit 1, there are 3 PDCCH monitoring occasions, that is, M=3.

When m=0, UE receives one DCI 1 in DCI format one that schedules one PDSCH 1, where $V_{C\text{-}DAI,c,m}=1$. In uplink time unit 1, HARQ-ACK is fed back for PDSCH 1. According to pseudo-code 1, the number of bits of the DAI field in the current DCI format is not N1 and does not satisfy $(V_{C\_DAI,c,m}-1) \bmod 2^{N2-N1}+1 \leq V3$, and thus $V3=V_{C\_DAI,c,m}-1) \bmod 2^{N2-N1}+1=1$. After that $V1=V_{C\_DAI,c,m}=1$ $V2=V_{C\_DAI,c,m}=1$, $O^{ACK}=T2\cdot j+V2=1$. $\tilde{o}_0^{ACK}$ is HARQ-ACK information for PDSCH 1. $V_S=\{\}$, j=0, k=0.

When m=1, UE receives one DCI 2 in DCI format one that schedules one PDSCH 2, where $V_{C\_DAI,c,m}=2$. In the uplink time unit 1, HARQ-ACK is fed back for this PDSCH 2. According to pseudo-code 1, the number of bits of DAI field in the current DCI format is not N1 and does not satisfy $(V_{C\_DAI,c,m}-1) \bmod 2^{N2-N1}+1 \leq V3$, and thus $V3=(V_{C\_DAI,c,m}-1) \bmod 2^{N2-N1}+1=2$. After that, $V1=V_{C\_DAI,c,m}=2$, $V2=V_{C\_DAI,c,m}=2$, $O^{ACK}=T2\cdot j+V2=2$. $\tilde{o}_1^{ACK}$ is HARQ-ACK information for PDSCH 2. $V_S=\{0, 1\}$, j=0, k=0.

When m=2, the UE receives one DCI 3 in DCI format two that schedules one PDSCH 3, where $V_{C\text{-}DAI,c,m}=1$. In the uplink time unit 1, HARQ-ACK is fed back for this PDSCH 3. According to pseudo-code 1, the number of bits of the DAI field in the current DCI format is N1 and satisfies $V_{C\_DAI,c,m} \leq V3$, and thus $k=(k+1) \bmod 2^{N2-N1}=1$, $V3=V_{C\_DAI,c,m}=1$, $V_{C\_DAI,c,m}=V_{C\_DAI,c,m}+k\cdot 2^{N1}=3$, $V1=V_{C\_DAI,c,m}=3$, $V2=V_{C\_DAI,c,m}=3$, $O^{ACK}=T2\cdot j+V2=3$. $\tilde{o}_2^{ACK}$ is HARQ-ACK information for PDSCH 3. $V_S=\{0, 1, 2\}$, j=0, k=1.

This embodiment converts values of DAI expressed in different numbers of bits into values of DAI expressed in the maximum number of bits among the different numbers of bits, which may guarantee a consistent understanding of the DAI information between the BS and the UE, ensures that encoding and decoding of the HARQ-ACK codebook are carried out according to a unified rule, and improves reliability of the HARQ-ACK codebook.

It should be noted that this solution is also suitable for the scenario where one PDSCH corresponds to multi-bit HARQ-ACK feedback, which only needs to expand the corresponding 1-bit HARQ-ACK information into multi-bits HARQ-ACK information with other manners unchanged.

According to an embodiment of the present disclosure, by modifying the above pseudo-code 1, the unified number of bits could also be set to the minimum number of bits among different numbers of bits representing values of DAI in the above step 302, so that the values of DAI represented by different numbers of bits is converted into values of DAI represented by the minimum number of bits among the different numbers of bits, and then the HARQ-ACK codebook is determined based on the converted values of DAI.

This embodiment converts the values of DAI expressed in different numbers of bits into the values of DAI expressed in the minimum number of bits among the different numbers of bits, which may guarantee a consistent understanding of the DAI information between BS and UE, ensures that encoding and decoding of the HARQ-ACK codebook are carried out according to a unified rule, and improves reliability of the HARQ-ACK codebook.

It should be noted that this solution is also suitable for the scenario where one PDSCH corresponds to multi-bit HARQ-ACK feedback, which only needs to expand the corresponding 1-bit HARQ-ACK information into multi-bit HARQ-ACK information with other manners unchanged.

Furthermore, if the HARQ-ACK codebook is transmitted on PUCCH, it is also necessary to determine the number of information bits $n_{HARQ-ACK}$ of the HARQ-ACK codebook related to PUCCH power control. The total number of UCI (uplink control information) bits is less than or equal to 11, $n_{HARQ-ACK}$ is determined by the number of bits of the DCI field in DCI received in the last monitoring occasion. When the number of DCI received in the last monitoring occasion is greater than 1, the number of bits of the DAI field in all DCI is the same. In particular, in the case where no serving cell is configured with CBG (code block group) retransmission, $n_{HARQ-ACK}$ is determined by the following equation (1).

$$n_{HARQ-ACK} = \\ n_{HARQ-ACK,TB} = \left(\left(V_{DAI,m_{last}} - \sum_{c=0}^{N_{cells}-1} U_{DAI,c}\right) \bmod 2^N\right) N_{TB,max} + \\ \sum_{c=0}^{N_{cells}-1}\left(\sum_{m=0}^{M-1} N_{m,c}^{received} + N_{SPS,c}\right) \quad (1)$$

if $N_{cells}=1$, $V_{DAI,m_{last}}$ is C-DAI in the DCI received by the UE in the last monitoring occasion m of the set M. At this time, N could be the number of bits for the C-DAI in the DCI.

if $N_{cells}>1$, then

If the DCI received by the UE in the last monitoring occasion m of the set M does not include a T-DAI field, $V_{DAI,m_{last}}$ is C-DAI in the DCI received by the UE in the last monitoring occasion m of the set M, and at this time, N could be the number of bits for the C-DAI in the DCI. Otherwise, $V_{DAI,m_{last}}$ is T-DAI in the DCI received by the UE in the last monitoring occasion m of the set M, and at this time, N could be the number of bits for the T-DAI in the DCI.

if the UE does not receive DCI in the set M, $V_{DAI,m_{last}}^{DL}=0$.

$U_{DAI,c}$ is the number of DCI on serving cell c received by the UE in the set M. If the UE does not receive the DCI on serving cell c in the set M, $U_{DAI,c}=0$.

If one PDSCH includes 2 TBs and no bundling operation is performed for HARQ-ACK, $N_{TB,max}^{DL}=2$, otherwise $N_{TB,max}^{DL}=1$.

When no bundling operation is performed for HARQ-ACK, $N_{m,c}^{received}$ is the number of TBs received on serving cell c in PDCCH monitoring occasion m; when bundling operation is performed for HARQ-ACK, $N_{m,c}^{received}$ is the number of PDSCHs received on serving cell c in PDCCH monitoring occasion m.

$N_{m,c}^{received}$ includes the number of DCI(s) indicating SPS PDSCH release received on serving cell c in PDCCH monitoring occasion m.

$N_{SPS,c}$ is the number of received SPS PDSCHs on serving cell c.

It should be noted that, in the case where the serving cell is configured with CBG retransmission, the same method may be used to determine the HARQ-ACK information bits $n_{HARQ-ACK}$ for calculating PUCCH power.

In this embodiment, the number of information bits $n_{HARQ-ACK}$ of the HARQ-ACK codebook related to PUCCH power control is determined according to the number of bits of the DAI field in the DCI received in the last monitoring occasion, which may guarantee a consistent understanding of PUCCH transmission power between the base station and the UE, and improve reliability of the HARQ-ACK codebook.

Figure 4:
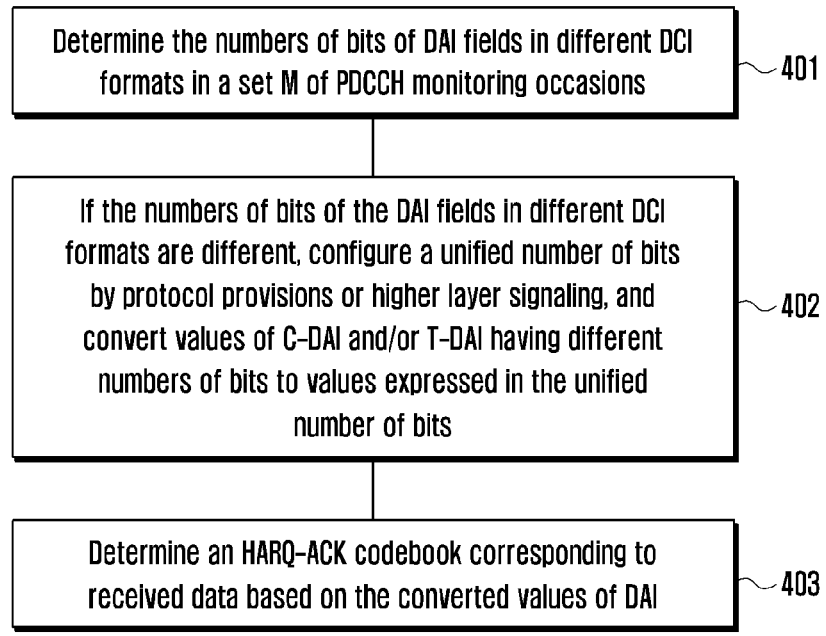
FIG. 4 shows a flowchart of converting values of DAIs represented by different numbers of bits in control signaling in different formats into values represented by a unified number of bits according to an embodiment of the present disclosure.

According to an embodiment of the present disclosure, when the number of bits representing C-DAI or T-DAI in different DCI formats is different, in the above step 302, a unified number of bits could be configured by standard specifications or high layer signaling, and then values of DAI expressed by different numbers of bits is converted into values of DAI expressed by the unified number of bits, as shown in FIG. 4.

FIG. 4 shows a flowchart of converting values of DAI represented by different numbers of bits in control signaling of different formats into values represented by a unified number of bits according to an embodiment of the present disclosure.

In step 401, the numbers of bits of DAI fields in different DCI formats in a set M of PDCCH monitoring occasions are determined, that is, the numbers of bits of C-DAI and/or T-DAI are determined.

In step 402, if the numbers of bits of DAI fields in different DCI formats are different, a unified number of bits is configured by standard specifications or high layer signaling, and values of C-DAI and/or T-DAI indicated by different numbers of bits are converted into values indicated by the unified number of bits.

In step 403, the HARQ-ACK codebook is determined based on the converted values of DAI.

In the case where the unified number of bits is configured by standard specifications or high layer signaling, according to the following pseudo-code 2, the unified number of bits is configured as the maximum number of bits N2 among the different numbers of bits expressing the values of DAI, and the values of DAI expressed in the different numbers of bits are converted into values of DAI expressed by the unified number of bits, thereby determining the HARQ-ACK codebook. In this embodiment, one PDSCH corresponds to 1-bit HARQ-ACK information, where T=2N2.

```
Pseudo-code 2:
Set m = 0 – m is an index of a PDCCH monitoring occasion
Set j = 0
Set V1 = 0
Set V2 = 0
Set V_s = ∅
Set N_cells to the number of serving cells configured for the UE
Set M to the number of PDCCH monitoring occasions
while m < M
    c = 0 – index of a serving cell
    while c < N^DL_cells
        if the PDCCH monitoring occasion m is before a BWP change on serving cell c
            c = c + 1;
        else
            if there is a PDCCH that schedules PDSCH on a serving cell c or indicates SPS
            PDSCH release on the serving cell c PDCCH monitoring occasion m
                if V_{C-DAI,c,m} ≤ V1
                    j = j + 1
                end if
                V1 = V_{C-DAI,c,m}
                if V_{T-DAI,m} = ∅
                    V2 = V_{C-DAI,c,m}
                else
                    V2 = V_{T-DAI,m}
                end if
                $\tilde{o}^{ACK}_{T2 \cdot j + V_{C-DAI,m} - 1}$ = HARQ-ACK information
                V_S = V_S U {T2 · j + V_{C-DAI,c,m} − 1}
            end if
            c = c + 1
        end if
    end while
    m = m + 1
end while
if V2 < V1
    j = j + 1
end if
O^{ACK} = T2 · j + V2
$\tilde{o}^{ACK}_j$ = NACK for any i∈{0,1...,O^{ACK} −1}\V_s
end while
```

In particular, assume that there is one serving cell in this embodiment. C-DAI in DCI format one received by the UE is 2 bits, a C-DAI field in DCI format two is 1 bit, and neither DCI format one nor DCI format two has a T-DAI field. DCI format one may be DCI format 1_0/1_1/1_2, and DCI format two may be DCI format 1_0/1_1/1_2. For the HARQ-ACK codebook fed back in the uplink time unit 1, there are 3 PDCCH monitoring occasions, that is, M=3.

When m=0, UE receives one DCI 1 in DCI format one that schedules one PDSCH 1, where $V_{C\text{-}DAI,c,m}=1$. In the uplink time unit 1, HARQ-ACK is fed back for this PDSCH 1. According to pseudo-code 2, V1=1 and V2=1. $\tilde{o}_0^{ACK}$ is HARQ-ACK information for PDSCH 1. $V_S=\{0\}$, j=0.

When m=1, UE receives one DCI 2 in DCI format one that schedules one PDSCH 2, where $V_{C\text{-}DAI,c,m}=2$. In the uplink time unit 1, HARQ-ACK is fed back for this PDSCH 2. According to pseudo-code 2, V1=2 and V2=2. $\tilde{o}_1^{ACK}$ is HARQ-ACK information for PDSCH 2. $V_S=\{0, 1\}$, j=0.

When m=2, UE receives one DCI 3 in DCI format two that schedules one PDSCH 3, where $V_{C\text{-}DAI,c,m}=1$. In the uplink time unit 1, HARQ-ACK is fed back for this PDSCH 3. According to pseudo-code 2, V1=1 and V2=1. $\tilde{o}_2^{ACK}$ is HARQ-ACK information for PDSCH 3. $V_S=\{0, 1, 4\}$, j=1. Based on this, UE believes that two DCI missed detections have appeared between PDSCH 3 and PDSCH 2, and thus $\tilde{o}_2^{ACK}$=NACK, $\tilde{o}_3^{ACK}$=NACK.

When this embodiment is used to determine $n_{HARQ\text{-}ACK}$ in equation (1), N is N2.

In this embodiment, the unified number of bits is configured through standard specifications and higher layer signaling, and the values of DAI expressed in different numbers of bits are converted into the values of DAI expressed in the maximum number of bits among the different numbers of bits, which may guarantee a consistent understanding of DAI information between BS and UE, ensures that encoding and decoding of the HARQ-ACK codebook are carried out according to a unified rule, and improves reliability of the HARQ-ACK codebook.

It should be noted that this solution is also suitable for the scenario where one PDSCH corresponds to multi-bit HARQ-ACK feedback, which only needs to expand the corresponding 1-bit HARQ-ACK information into multi-bit HARQ-ACK information with other manners unchanged.

According to an embodiment of the present disclosure, when the number of bits representing C-DAI or T-DAI in different DCI formats is different, the unified number of bits can also be configured as the minimum number of bits N1 among different numbers of bits representing values of DAI by standard specifications or high layer signaling, and the values of DAI represented by the different numbers of bits are converted into values of DAI represented by the unified number of bits, thereby determining the HARQ-ACK codebook.

When the number of bits Nx of a DAI field is greater than N1, a range that may be indicated by the DAI field is an integer within the range [1, 2N1]. Nx-N1 MSBs are reserved bits.

In the case where the unified number of bits is configured by standard specifications or high layer signaling, by modifying the above pseudo-code 2, the unified number of bits is configured as a minimum number of bits N1 among the different numbers of bits representing the values of DAI, and the values of DAI expressed in the different numbers of bits are converted into values of DAI expressed by the unified number of bits, thereby determining the HARQ-ACK codebook.

In particular, BS configures a number of bits of C-DAI in DCI format 1_2 as 1, and a number of bits of C-DAI in DCI format 1_0 as 2. The number of bits for C-DAI in DCI format 1_1 is 2. At this time, MSBs of C-DAI in DCI format 1_0 and DCI format 1_1 are reserved bits. The unified number of bits is configured as 1 by standard specifications or high layer signaling, and the values of DAI represented by different numbers of bits are converted into values of DAI represented by the unified number of bits.

When this embodiment is used to determine $n_{HARQ\text{-}ACK}$ in equation (1), N is N1.

In this embodiment, the unified number of bits is configured through standard specifications and higher layer signaling, and the values of DAI expressed in different numbers of bits are converted into the values of DAI expressed in the minimum number of bits among the different numbers of bits, which may guarantee a consistent understanding of the DAI information between the BS and the UE, ensures that encoding and decoding of the HARQ-ACK codebook are carried out according to a unified rule, and improves reliability of the HARQ-ACK codebook.

It should be noted that this solution is also suitable for the scenario where one PDSCH corresponds to multi-bit HARQ-ACK feedback, which only needs to expand the corresponding 1-bit HARQ-ACK information into multi-bit HARQ-ACK information with other manners unchanged.

According to an embodiment of the present invention, when the number of bits representing C-DAI or T-DAI in different DCI formats is different, the unified number of bits may also be determined according to a priority of the HARQ-ACK codebook. For example, the priority of the HARQ-ACK codebook may be indicated by 1 bit in DCI, where 1 indicates a high priority and 0 indicates a low priority; or conversely, 0 indicates a high priority and 1 indicates a low priority. The unified number of bits corresponding to HARQ-ACK codebooks of different priorities may be different. For example, when DCI format 1_2 is only used to schedule a high-priority HARQ-ACK codebook corresponding to PDSCH, the number of bits, 1, of the DAI field is taken as the unified number of bits to determine the high-priority HARQ-ACK codebook. Similarly, the number of bits, 2, of the DAI field is taken as the unified number of bits to determine a low-priority HARQ-ACK codebook.

This embodiment determines the unified number of bits according to the priority of the HARQ-ACK codebook, and converts values of DAI expressed in different numbers of bits into values of DAI expressed in the unified numbers of bits, which may guarantee a consistent understanding of the DAI information between the BS and the UE, ensures that encoding and decoding of the HARQ-ACK codebook are carried out according to a unified rule, and improves reliability of the HARQ-ACK codebook.

It should be noted that this solution is also applicable to the scenario where one PDSCH corresponds to multi-bit HARQ-ACK feedback, which only needs to expand the corresponding 1-bit HARQ-ACK information into multi-bit HARQ-ACK information with other manners unchanged.

It should be noted that all the above methods are described by taking one HARQ-ACK codebook corresponding to one PDSCH group as an example, while the above methods are also suitable for a scenario where one HARQ-ACK codebook corresponds to multiple PDSCH groups. Take two PDSCH groups, PDSCH group 0 and PDSCH group 1, as an example, one of the above methods may be used to generate HARQ-ACK codebooks for PDSCH group 0 and PDSCH group 1, respectively, and then generate a total HARQ-ACK codebook. If the HARQ-ACK codebook is transmitted on PUCCH, the number of HARQ-ACK information bits for calculating PUCCH power also needs to be determined for the PDSCH group 0 and the PDSCH group 1, respectively. The total number of HARQ-ACK information bits is a sum of the numbers of HARQ-ACK information bits of the PDSCH group 0 and the PDSCH group 1. In particular, taking two PDSCH groups as an example, $n_{HARQ-ACK,i}$ for a PDSCH group i is determined firstly according to equation (1), and i=1,2.

In the case where a DCI that triggers PDSCH group i simultaneously schedules PDSCHs of the PDSCH group i or indicates SPS PDSCH releases of the PDSCH group i:

if $N_{cells}$=1, $V_{DAI,m_{last}}$ is C-DAI in the DCI received by the UE in the last monitoring occasion m of the set M of the PDSCH group i. At this time, N can be the number of bits for the C-DAI in the DCI.

if $N_{cells}$>1, then

If the DCI received by UE in the last monitoring occasion m of the set M of the PDSCH group i does not contain a T-DAI field, $V_{DAI,m_{last}}$ is C-DAI in the DCI received by the UE in the last monitoring occasion m of the set M of the PDSCH group i, and at this time, N could be the number of bits of C-DAI in the DCI. Otherwise, $V_{DAI,m_{last}}$ is T-DAI in the DCI received by UE in the last monitoring occasion m of the set M of the PDSCH group i, and at this time, N can be the number of bits of the T-DAI in the DCI.

if UE does not receive DCI in the set M of the PDSCH group i, $V_{DAI,m_{last}}^{DL}$=0.

In the case where a DCI that triggers the PDSCH group i simultaneously schedules PDSCH of a non-PDSCH group i or indicates SPS PDSCH releases of a non-PDSCH group i:

If DCI includes a T-DAI field of the PDSCH group i, $V_{DAI,m_{last}}$ is T-DAI of the PDSCH group i indicated in the DCI. N can be the number of bits of T-DAI in the DCI.

If the DCI does not include a T-DAI field of the PDSCH group i, $V_{DAI,m_{last}}$ is determined according to C-DAI and/or T-DAI in DCI that schedules PDSCHs of the PDSCH group i, or indicates SPS PDSCH releases of the PDSCH group i, received in the last monitoring occasion m of the set M of the PDSCH group i. N can be the number of bits of C-DAI and/or T-DAI bits in the DCI.

It should be noted that, if there are multiple DCIs that triggers the PDSCH group i, $n_{HARQ-ACK,i}$ is determined according to the last received DCI that triggers the PDSCH group i Finally, the total number of HARQ-ACK information bits is calculated according to equation (2). Taking two PDSCH groups as an example, and the value of i is 0, 1.

$$n_{HARQ-ACK} = \sum_i n_{HARQ-ACK,i} \qquad (2)$$

In another embodiment, when HARQ-ACK information that is dynamically scheduled needs to be fed back together with HARQ-ACK information of SPS PDSCH(s) that is not dynamically scheduled, the HARQ-ACK codebook can be divided into two parts: the first part corresponds to dynamically scheduled PDSCH(s) and/or DCI(s) indicating SPS PDSCH release and is generated according to C-DAI and/or T-DAI in dynamic scheduling DCI(s) while the second part corresponds to activated SPS PDSCH(s) without dynamic scheduling DCI(s). The second part is placed after the first part. For example, the 3GPP TS 38.213 Type-2 HARQ-ACK codebook.

After the base station transmits a DCI indicating a SPS PDSCH release, for example, SPS PDSCH #1, the base station will no longer continue to transmit data of SPS PDSCH #1 to the UE. When the HARQ-ACK codebook includes DCI(s) indicating SPS PDSCH release, the HARQ-ACK codebook can be generated in the following two ways.

In a first method, the HARQ-ACK codebook of the activated SPS PDSCH(s) without dynamic scheduling DCI(s) in the second part does not include HARQ-ACK information of the SPS PDSCH(s) that has been released.

In a second method, the HARQ-ACK codebook of the activated SPS PDSCH(s) without dynamic scheduling DCI(s) in the second part includes HARQ-ACK information of the SPS PDSCH(s) that has been released. The UE needs to feed back HARQ-ACK information for an activated SPS PDSCH, until the UE has fed back HARQ-ACK information for the DCI indicating the corresponding SPS PDSCH release and the HARQ-ACK information is ACK.

It should be noted that the number of SPS PDSCH configurations in this embodiment may be one or multiple. When there are multiple activated SPS PDSCHs on an activated BWP, the SPS PDSCHs may overlap, and the base station will select and transmit the SPS PDSCH with the smallest index from the multiple overlapping SPS PDSCHs. Similarly, the HARQ-ACK codebook may be generated in the following two ways.

In a first method, after the base station transmits a DCI indicating a SPS PDSCH release, it will reselect and transmit the SPS PDSCH with the smallest index among the activated multiple overlapping SPS PDSCHs. The UE generates the HARQ-ACK codebook according to the activated SPS PDSCHs.

In a second method, after the base station transmits a DCI indicating a SPS PDSCH release, it will not reselect and transmit the SPS PDSCH with the smallest index among the activated multiple overlapping SPS PDSCHs. Only after receiving the DCI indicating the SPS PDSCH release fed back by the UE, the base station will reselect and transmit the SPS PDSCH with the smallest index among the activated multiple overlapping SPS PDSCHs. The UE generates the HARQ-ACK codebook according to a same rule. That is, before transmitting an ACK for the DCI indicating the SPS PDSCH release, the UE considers that the SPS PDSCH configuration indicated by the DCI indicating the SPS PDSCH release is an activated configuration. After transmitting an ACK for the DCI indicating the SPS PDSCH release, the UE considers that the SPS PDSCH configuration indicated by the DCI indicating the SPS PDSCH release is an inactivated configuration.

As compared with the first method, the second method may guarantee a consistent understanding of a size and an ordering of the HARQ-ACK codebook between the UE and the base station, and improve reliability of the HARQ-ACK codebook. When the UE does not receive this DCI indicating the SPS PDSCH release, the size of the HARQ-ACK codebook generated according to the first method may be inconsistent with the size of the HARQ-ACK codebook the base station expects to receive, while the size of the HARQ-ACK codebook generated according to the second method may be the same as the size of the HARQ-ACK codebook the base station expects to receive. The ordering of bits in the HARQ-ACK codebook is also not affected. Reliability of the HARQ-ACK codebook may be improved.

In another embodiment, a UE is configured with dynamic HARQ-ACK codebook, such as 3GPP 38.213 Type-2 codebook. The UE receives one uplink scheduling DCI scheduling one PUSCH. A PUCCH containing HARQ-ACK overlaps with the PUSCH in the time domain, and the UE transmits HARQ-ACK information on the PUSCH. In this embodiment, the second type of DAI is UL-DAI (Uplink DAI). The UE determines the size of the HARQ-ACK codebook according to UL-DAI. The number of bits indicating UL-DAI in DCI may not be consistent with the number of bits for C-DAI. How to determine the size of the HARQ-ACK codebook is a problem to be solved.

The number of bits for C-DAI is $N_{C\text{-}DAI}^{DL}$, where $N_{C\text{-}DAI}^{DL}$ may be an integer. For example, $N_{C\text{-}DAI}^{DL}$ may be 1. For another example, $N_{C\text{-}DAI}^{DL}$ may be 2. $T_D = 2_{C\text{-}DAI}^{NL}$.

The number of bits for UL-DAI is $N_{DAI}^{UL}$, where $N_{DAI}^{UL}$ may be an integer. For example, $N_{DAI}^{DL}$ may be 2. $T_U = 2^{N_{DAI}^{UL}}$.

In the following pseudo-code, j represents a quotient of the total number of downlink DCIs fed back on a same PUCCH minus 1 divided by TD. For example, j may be determined according to the pseudo-code of the 3GPP 38.213 Type-2 codebook. Alternatively, j may also be determined according to the pseudo-code 1 and/or the pseudo-code 2 in the present disclosure. For example, $N_{C\text{-}DAI}^{DL}$ is 1, and TD is 2, the UE receives 7 PDSCHs scheduled by downlink DCIs in 7 different PDCCH monitoring occasions, all of which are fed back in a same uplink slot, for example, the slot n. The value of C-DAI is 1, 2, 1, 2, 1, 2, 1, sequentially. At this time, j is equal to 3. Taking 1 DCI for 1-bit HARQ-ACK feedback as an example, the size of the codebook determined by the UE according to C-DAI is 7. $N_{DAI}^{UL}$ is 2 bits, and an uplink DCI received by the UE indicates that UL DAI is 1. According to Table 1, UL DAI being indicated as 1 means that an actual DAI is 1, or 5, or 9, and so on. The base station actually transmitted 9 DCI, and the UE missed the last 2 DCI.

C-DAI may be converted to be counted with $N_{DAI}^{UL}$ bits, then compared with UL DAI, and j is determined according to the converted C-DAI and UL DAI. Finally, the size of the HARQ-ACK codebook is determined according to a value of j and UL DAI. UL DAI may be converted to be counted with $N_{C\text{-}DAI}^{DL}$ bits. For example, the size of the HARQ-ACK codebook is determined according to the following pseudo-code, where Vtemp2 is UL DAI, and Vtemp is the last C-DAI received by the UE. $O^{ACK}$ is the size of the HARQ-ACK codebook.

```
if V_temp2 < (j mod (2^(N^UL_DAI - N^DL_C-DAI))) × (2^(N^UL_DAI - N^DL_C-DAI)) + V_temp
    if (T_D = 2)&(V_temp mod T_D = 0)& ((j mod (2^(N^UL_DAI - N^DL_C-DAI))) × (2^(N^UL_DAI - N^DL_C-DAI)) + V_temp - V_temp2 = 1)
        j = j + 2
    else
        j = j + 1
    end if
end if
if V_temp2 - (j mod (2^(N^UL_DAI - N^DL_C-DAI))) × (2^(N^UL_DAI - N^DL_C-DAI)) + V_temp) ≥ T_D
    j = j + 1
end if
``` if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell,

```
O^ACK = 2 · (T_D · j + ((V_temp2 - 1)modT_D + 1))
else
    O^ACK = T_D · j + ((V_temp2 - 1)modT_D + 1)
end if
```

For example, when the number of bits for UL DAI is 2, the pseudo-code may also be:

```
if V_temp2 < (j mod (4/T_D)) × (4/T_D) + V_temp
    if (T_D = 2) & (V_temp mod T_D = 0) &
        ((j mod (4/T_D)) × (4/T_D) + V_temp - V_temp2 = 1)
        j = j+2
    else
        j = j+1
    end if
end if
if V_temp2 - (j mod (4/T_D)) × (4/T_D) + V_temp) ≥ T_D
    j = j+1
end if
``` if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell,

```
O^ACK = 2 · j + ((V_temp2 - 1)modT_D +1 ))
else
    O^ACK = T_D · j + ((V_temp2 - 1)modT_D + 1)
end if
```

For another example, when the number of bits for UL DAI is 2, the pseudo-code may also be:

```
if V_temp2 < (j mod (4/T_D)) × (4/T_D) + V_temp
    if (T_D = 2) & (V_temp mod T_D = 0) &
        ((j mod (4/T_D)) × (4/T_D) + V_temp - V_temp2 = 1)
        j=j+2
    else
        j = j+1
    end if
end if
if V_temp2 - (j mod (4/T_D)) × (4/T_D) + V_temp) ≥ T_D
    j = j+1
end if
``` if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell, $$O^{ACK} = 2 \cdot (T_D \cdot j + ((V_{temp2} - 1) \bmod T_D + 1))$$
else
$$O^{ACK} = T_D \cdot j + ((V_{temp2} - 1) \bmod T_D + 1)$$
end if Alternatively, j may be converted to be counted with $N_{DAI}^{UL}$ bits, C-DAI may be converted to be counted with $N_{DAI}^{UL}$ bits, and then compared with UL DAI. If the converted C-DAI is greater than UL DAI, j=j+1. Finally, the size of the HARQ-ACK codebook is determined according to the value of j and UL DAI. For example, the size of the HARQ-ACK codebook is determined according to the following pseudo-code, where Vtemp2 is UL DAI, and Vtemp is the last C-DAI received by the UE. OACK is the size of the HARQ-ACK codebook.

$$V_{temp} = \left(j \bmod \left(2^{N_{DAI}^{UL} - N_{C-DAI}^{DL}}\right)\right) \times \left(2^{N_{DAI}^{UL} - N_{C-DAI}^{DL}}\right) + V_{temp}$$

$$j = \left\lfloor j \div \left(2^{N_{DAI}^{UL} - N_{C-DAI}^{DL}}\right)\right\rfloor$$

if $V_{temp2} < V_{temp}$
  j = j+1
end if if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell, $$O^{ACK} = 2 \cdot (2^{N_{DAI}^{UL}} \cdot j + V_{temp2})$$
else
$$O^{ACK} = 2^{N_{DAI}^{UL}} \cdot j + V_{temp2}$$
end if For example, when the number of bits for UL DAI is 2, the pseudo-code may also be:

$$V_{temp} = \left(j \bmod \left(\frac{4}{T_D}\right)\right) \times \left(\frac{4}{T_D}\right) + V_{temp}$$

$$j = \left\lfloor j \div \left(\frac{4}{T_D}\right)\right\rfloor$$

if $V_{temp2} < V_{temp}$
  j = j+1
end if if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell, $$O^{ACK} = 2 \cdot (4 \cdot j + V_{temp2})$$
else
$$O^{ACK} = 4 \cdot j + V_{temp2}$$
end if This method determines the HARQ-ACK codebook based on UL DAI, up to 3 missed DCIs can be detected, which increases the reliability of HARQ-ACK codebook transmission, and ensures a consistent understanding of the HARQ-C-ACK codebook between the UE and the base station. At the same time, the reliability of uplink data transmission can be improved, and a probability of downlink data retransmission can be reduced, thereby reducing the transmission delay of downlink data and improving spectrum efficiency of the system.

In another embodiment, a UE is configured with dynamic HARQ-ACK codebook, such as 3GPP 38.213 Type-2 codebook. If the UE receives an uplink scheduling DCI scheduling a PUSCH, and a PUCCH containing HARQ-ACK overlaps with the PUSCH in the time domain, the UE transmits the HARQ-ACK information on the PUSCH. At this time, the second type of DAI may be UL-DAI. The UE determines the size of the HARQ-ACK codebook according to UL-DAI.

If the UE does not receive an uplink scheduling DCI scheduling a PUSCH that overlaps with a PUCCH containing HARQ-ACK in the time domain, the UE transmits the HARQ-ACK information on the PUCCH. The second type of DAI may be T-DAI. If the DCI received by the UE in the last PDCCH monitoring occasion includes T-DAI, the UE determines the size of the HARQ-ACK codebook according to the T-DAI included in the DCI received in the last PDCCH monitoring occasion. If DCI received by the UE in the last PDCCH monitoring occasion does not include T-DAI, the UE determines the size of the HARQ-ACK codebook according to the C-DAI included in the last DCI received in the last PDCCH monitoring occasion. The number of bits indicating UL-DAI in DCI may not be the same as the number of bits for C-DAI. How to determine the size of the HARQ-ACK codebook is a problem to be solved.

The number of bits for C-DAI is $N_{C-DAI}^{DL}$, where $N_{C-DAI}^{DL}$ may be an integer. For example, $N_{C-DAI}^{DL}$ may be 1. For another example, $N_{C-DAI}^{DL}$ may be 2. $T_D = 2^{N_{C-DAI}^{DL}}$.

The number of bits for UL-DAI is $N_{DAI}^{UL}$, where $N_{DAI}^{UL}$ may be an integer. For example, $N_{DAI}^{UL}$ may be 2. $T_U = 2^{N_{DAI}^{UL}}$.

In the following pseudo-code, j represents a quotient of the total number of downlink DCIs fed back on a same PUCCH minus 1 divided by TD. For example, j may be determined according to the pseudo-code of the 3GPP 38.213 Type-2 codebook. Alternatively, j may also be determined according to the pseudo-code 1 and/or the pseudo-code 2 in the present disclosure. Since the HARQ-ACK codebook may be determined according to C-DAI, and/or T-DAI, and/or UL DAI, various situations and the number of bits of respective DAIs need to be considered to determine the HARQ-ACK codebook.

The respective DAIs may be converted to a uniform number of bits, and then whether there is a missed detection is determined, so as to determine the size of the HARQ-ACK codebook. For example, if the maximum number of bits in the respective DAIs is Nmax, all the respective DAIs may be converted to be represented by Nmax bits, and then it is judged whether there is a missed detection and the size of the HARQ-ACK codebook is determined. For another example, if the minimum number of bits in the respective DAIs is Nmin, all the respective DAIs may be converted to be represented by Nmin bits, and then it is judged whether there is a missed detection and the size of the HARQ-ACK codebook is determined. For example, if the converted second type of DAI represented by same number of bits is less than C-DAI, it indicates that there is DCI missed detection and the value of j would be updated.

For example, C-DAI is converted to be counted with $N_{DAI}^{UL}$ bits, and the second type of DAI is converted to be counted with $N_{DAI}^{UL}$ bits, for example, Vtemp2 is used to represent the second type of DAI. Whether the UE is with a missed detection and the size of the HARQ-ACK codebook are determined according to the converted C-DAI and the second type of DAI. For example, after the converted C-DAI and second type of DAI are converted to be counted with $N_{DAI}^{UL}$ bits, j2 may be used to represent a quotient of the total number of downlink DCIs fed back on the same PUCCH minus 1 divided by $2^{N_{DAI}^{DL}}$. For example, $j2 = \lfloor j \div (2^{N_{DAI}^{UL} - N_{C-DAI}^{DL}}) \rfloor$. If the converted second type of DAI represented by same number of bits is less than C-DAI, it indicates that there is DCI missed detection and the value of j2 would be updated. For example, j2=j2+1. The size of the HARQ-ACK codebook may be determined according to j2 and the second type of DAI. For example, $O^{ACK}=4 \cdot j2 + V_{temp2}$.

Vtemp represents the C-DAI included in the last DCI received by the UE in the last PDCCH monitoring occasion. $O^{ACK}$ represents the size of the HARQ-ACK codebook.

For example, after the completion of the c and m loops in the pseudo-code of generating the HARQ-ACK codebook in 3GPP TS38.213 9.1.3.1, the size of the HARQ-ACK codebook may be determined according to the following pseudo-code.

---

$V_{temp} = (j \bmod (2^{N_{DAI}^{UL}-N_{C-DAI}^{DL}})) \times (2^{N_{DAI}^{UL}-N_{C-DAI}^{DL}}) + V_{temp}$
if $V_{temp2}$ is not replaced by UL DAI
$V_{temp2} = (j \bmod (2^{N_{DAI}^{UL}-N_{C-DAI}^{DL}})) \times (2^{N_{DAI}^{UL}-N_{C-DAI}^{DL}}) + (V_{temp2} - 1) \bmod T_D + 1$
end if
$j2 = \lfloor j \div (2^{N_{DAI}^{UL}-N_{C-DAI}^{DL}}) \rfloor$
if $V_{temp} < V_{temp2}$
  j2 = j2+1
end if

--- if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by one DCI (for example, maxNrofCodeWordsScheduledByDCI) with value of 2 for at least one DL BWP of a serving cell,

---

$$O^{ACK} = 2 \cdot (2^{N_{DAI}^{UL}} \cdot j2 + V_{temp2})$$
else
$$O^{ACK} = 2^{N_{DAI}^{UL}} \cdot j2 + V_{temp2}$$
end if

---

For another example, DAIs are converted on the basis of 2 bits, after the completion of the c and m loops in the pseudo-code of generating the HARQ-ACK codebook in 3GPP TS38.213 9.1.3.1, the size of the HARQ-ACK codebook may be determined according to the following pseudo-code.

---

$V_{temp} = \left(j \bmod \left(\frac{4}{T_D}\right)\right) \times \left(\frac{4}{T_D}\right) + V_{temp}$

--- if $V_{temp2}$ represents C-DAI in the last DCI format
  $V_{temp2} = V_{temp}$
end if
$j2 = \lfloor j \div \left(\frac{4}{T_D}\right) \rfloor$
if $V_{temp2} < V_{temp}$
  j2 = j2+1
end if

--- if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by a DCI (for example, maxNrofCodeWordsScheduledByDCI) with value of 2 for at least one DL BWP of a serving cell,

---

$$O^{ACK} = 2 \cdot (4 \cdot j2 + V_{temp2})$$
else
$$O^{ACK} = 4 \cdot j2 + V_{temp2}$$
end if

---

For another example, DAIs are converted on the basis of 2 bits, after the completion of the c and m loops in the pseudo-code of generating the HARQ-ACK codebook in 3GPP TS38.213 9.1.3.1, the size of the HARQ-ACK codebook may be determined according to the following pseudo-code.

---

$V_{temp} = \left(j \bmod \left(\frac{4}{T_D}\right)\right) \times \left(\frac{4}{T_D}\right) + V_{temp}$
if the UE does not set $V_{temp2} = V_{DAI}^{UL}$ and $T_D = 2$
  $V_{temp2} = V_{temp}$
end if
$j = \lfloor \frac{j \times T_D}{4} \rfloor$
if $V_{temp2} < V_{temp}$
  j = j+1
end if

--- if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by a DCI (for example, maxNrofCodeWordsScheduledByDCI) with value of 2 for at least one DL BWP of a serving cell,

---

$$O^{ACK} = 2 \cdot (4 \cdot j + V_{temp2})$$
else
$$O^{ACK} = 4 \cdot j + V_{temp2}$$
end if

---

For another example, DAIs are converted on the basis of 2 bits, DAIs are converted on the basis of 2 bits, after the completion of the c and m loops in the pseudo-code of generating the HARQ-ACK codebook in 3GPP TS38.213 9.1.3.1, the size of the HARQ-ACK codebook may be determined according to the following pseudo-code.

--- if $T_D=2$
  $V_{temp} = (j \bmod 2) \times 2 + V_{temp}$

-continued $$j = \left\lfloor \frac{j}{2} \right\rfloor$$
if the UE does not set $V_{temp2} = V_{DAI}^{UL}$
    $V_{temp2} = V_{temp}$
end if
end if
if $V_{temp2} < V_{temp}$
    j = j+1
end if if a parameter indicating HARQ-ACK spatial bundling on PUCCH (for example, harq-ACK-SpatialBundlingPUCCH) is not provided to the UE, and the UE is configured by a parameter indicating the maximum number of TBs scheduled by a DCI (for example, maxNrofCodeWordsScheduledByDCI) with value of 2 for at least one DL BWP of a serving cell, else
$$O^{ACK} = 2 \cdot (4 \cdot j + V_{temp2})$$
$$O^{ACK} = 4 \cdot j + V_{temp2}$$
end if This method converts respective DAIs into same bits according to the maximum number of bits of the DAIs, and then determines the HARQ-ACK codebook, up to 3 missed DCIs can be detected, which increases the reliability of HARQ-ACK codebook transmission, and ensures a consistent understanding of the HARQ-ACK codebook between the UE and the base station. At the same time, reliability of uplink data transmission can be improved, and a probability of downlink data retransmission can be reduced, thereby reducing the transmission delay of downlink data and improving spectrum efficiency of the system.

In another embodiment, a UE is configured with dynamic HARQ-ACK codebook, such as 3GPP 38.213 Type-2 codebook. If the UE receives an uplink scheduling DCI scheduling a PUSCH, and a PUCCH containing HARQ-ACK overlaps with the PUSCH in the time domain, the UE transmits the HARQ-ACK information on the PUSCH. At this time, the second type of DAI may be UL-DAI. The UE determines the size of the HARQ-ACK codebook according to UL-DAI. If the UE does not receive an uplink scheduling DCI scheduling a PUSCH that overlaps with a PUCCH containing HARQ-ACK in the time domain, the UE transmits HARQ-ACK information on the PUCCH. The second type of DAI may be T-DAI. If the UE also receives an SPS PDSCH with HARQ-ACK being fed back on the PUSCH, after the completion of the c and m loops in the pseudo-code of generating the HARQ-ACK codebook in 3GPP TS38.213 9.1.3.1, the UE would set $V_{temp2}=V_{DAI}^{UL}$, where Vtemp2 represents the second type of DAI. For example, the second type of DAI is T-DAI. $V_{DAI}^{UL}$ is UL DAI in uplink scheduling DCI. For example, $V_{DAI}^{UL}$ is UL DAI in the uplink scheduling DCI format 0_1. For another example, $V_{DAI}^{UL}$ is UL DAI in the uplink scheduling DCI format 0_2. Since UL DAI cannot be indicated as 0, the HARQ-ACK codebook contains at least one bit of NACK and HARQ-ACK information for SPS PDSCH. NACK in the HARQ-ACK codebook is an invalid bit. It may be optimized as follows.

For example, specification standards may specify as follows.

If the UE is not provided a CBG transmission parameter (for example, the parameter PDSCH-CodeBlockGroup-Transmission) and the UE is scheduled for a PUSCH transmission by a DCI format including UL DAI (for example, DCI format 0_1, and/or DCI format 0_2) with the DAI field value being 4, and the UE does not receive within the PDCCH monitoring occasions any DCI format for scheduling PDSCH receptions or indicating SPS PDSCH release on any serving cell c, and the UE does not multiplex HARQ-ACK information including dynamically scheduled PDSCH and/or indicating SPS PDSCH release on the PUSCH.

If the UE is provided a CBG transmission parameter (for example, the parameter PDSCH-CodeBlockGroupTransmission) and the UE is scheduled for a PUSCH transmission by a DCI format including UL DAI (for example, DCI format 0_1, and/or DCI format 0_2) with the first DAI field value being 4 in the DCI format, and the UE does not receive within the PDCCH monitoring occasions any DCI format for scheduling PDSCH receptions or indicating SPS PDSCH release associated with the first HARQ-ACK sub-codebook on any serving cell c, the UE does not multiplex HARQ-ACK information for the first sub-codebook including dynamically scheduled PDSCH and/or indicating SPS PDSCH release on the PUSCH.

If the UE is provided a CBG transmission parameter (for example, the parameter PDSCH-CodeBlockGroupTransmission) and the UE is scheduled for a PUSCH transmission by a DCI format including UL DAI (for example, DCI format 0_1, and/or DCI format 0_2) with the second DAI field value being 4 in the DCI format, and the UE does not receive within the PDCCH monitoring occasions any DCI format for scheduling PDSCH receptions or indicating SPS PDSCH release associated with the second HARQ-ACK sub-codebook on any serving cell c, the UE does not multiplex HARQ-ACK information for the second sub-codebook including dynamically scheduled PDSCH and/or indicating SPS PDSCH release on the PUSCH.

If the UE is scheduled for a PUSCH transmission by a DCI format including UL DAI (for example, DCI format 0_1, and/or DCI format 0_2) with the DAI field being 4 in the DCI format, or with the first DAI field value being 4 and the second DAI field value being 4, and the UE does not receive within the PDCCH monitoring occasions any DCI format for scheduling PDSCH receptions or indicating SPS PDSCH release on any serving cell c, and the PUCCH carrying HARQ-ACK for SPS PDSCH(s) received by the UE overlap with the PUSCH in the time domain, the UE multiplexes HARQ-ACK information for the SPS PDSCH(s) on the PUSCH transmission.

For another example, specification standards may specify as follows.

If the UE is not provided a CBG transmission parameter (for example, the parameter PDSCH-CodeBlockGroup-Transmission) and the UE is scheduled for a PUSCH transmission by a DCI format including UL DAI (for example, DCI format 0_1, and/or DCI format 0_2) with DAI field value being 4, and the UE does not receive within the PDCCH monitoring occasions any DCI format for scheduling PDSCH receptions or indicating SPS PDSCH release or secondary cell dormancy on any serving cell c, the UE does not multiplex HARQ-ACK information including dynamically scheduled PDSCH and/or indicating SPS PDSCH release and/or secondary cell dormancy on the PUSCH.

If the UE is provided a CBG transmission parameter (for example, the parameter PDSCH-CodeBlockGroupTransmission) and the UE is scheduled for a PUSCH transmission by a DCI format including UL DAI (for example, DCI format 0_1, and/or DCI format 0_2) with the first DAI field value being 4, and the UE does not receive within the PDCCH monitoring occasions any DCI format for scheduling PDSCH receptions or indicating SPS PDSCH release or secondary cell dormancy associated with the first HARQ-ACK sub-code on any serving cell c, the UE does not multiplex HARQ-ACK information for the first sub-codebook including dynamically scheduled PDSCH and/or indicating SPS PDSCH release and/or secondary cell dormancy on the PUSCH.

If the UE is provided a CBG transmission parameter (for example, the parameter PDSCH-CodeBlockGroupTransmission) and the UE is scheduled for a PUSCH transmission by a DCI format including UL DAI (for example, DCI format 0_1, and/or DCI format 0_2) with the second DAI field value being 4, and the UE does not receive within the PDCCH monitoring occasions any DCI format for scheduling PDSCH receptions associated with the second HARQ-ACK sub-code on any serving cell c, the UE does not multiplex HARQ-ACK information for the second sub-codebook including dynamically scheduled PDSCH on the PUSCH.

The UE is scheduled for a PUSCH transmission by a DCI format including UL DAI (for example, DCI format 0_1, and/or DCI format 0_2) with the DAI field value for the DCI format being 4, or the first DAI field being 4 and the second DAI field value being 4 for the DCI format, and the UE does not receive within the PDCCH monitoring occasions any DCI format for scheduling PDSCH receptions or indicating SPS PDSCH release on any serving cell c, and the PUCCH carrying HARQ-ACK for SPS PDSCH(s) received by the UE overlaps with the PUSCH in the time domain, the UE multiplexes HARQ-ACK information for the SPS PDSCH(s) generated according to TS 38.213 9.1.2 on the PUSCH transmission.

This method specifies a method for not generating dynamically scheduled HARQ-ACK when UL DAI is indicated being 4, which reduces the size of the HARQ-ACK codebook, improves reliability of HARQ-ACK codebook transmission, increases available resources for uplink data, and improve reliability of uplink data transmission.

In another embodiment, optionally, the UE is provided one or more activated SPS PDSCH configurations on a serving cell c. Optionally, a SPS PDSCH configuration i can be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config can be the same or different. When a SPS PDSCH configuration i is activated by a DCI format, for example, DCI format 1_2 or DCI format 1_1, and if the SPS PDSCH configuration i is configured with the number of PDSCH slot-based repetitions, pdsch-AggregationFactor, in SPS-Config, then the number of PDSCH slot-based repetitions of the SPS PDSCH configuration i is the number of PDSCH slot-based repetitions, pdsch-AggregationFactor, configured in SPS-Config, otherwise the number of PDSCH slot-based repetitions of the SPS PDSCH configuration i is the number of PDSCH slot-based repetitions, pdsch-AggregationFactor, configured in PDSCH-Config. The pdsch-AggregationFactor in PDSCH-Config can be configured as 2, 4 or 8, and if not configured, pdsch-AggregationFactor is defaulted as 1. The pdsch-AggregationFactor in SPS-Config can be configured as 1, 2, 4 or 8.

In the case of a semi-static HARQ-ACK codebook, such as the 3GPP TS 38.213 Type-1 HARQ-ACK codebook, since pdsch-AggregationFactor values configured in different SPS-Configs may be different, pdsch-AggregationFactor values of SPS PDSCH and dynamically scheduled PDSCH configuration may also be different. All values of pdsch-AggregationFactor need to be considered to generate the semi-static HARQ-ACK codebook.

The number of PDSCH slot-based repetitions for generating the semi-static HARQ-ACK codebook can be determined as a value by standard specifications or high layer signaling. In particular, the number of PDSCH slot-based repetitions for generating the semi-static HARQ-ACK codebook can be equal to the maximum value of the following two values, or may be equal to one of the following two values:
  a) the maximum value among the pdsch-AggregationFactor values configured in all SPS-Configs.
  b) pdsch-AggregationFactor value configured in PDSCH-Config.

It should be noted that if one of the above is not configured, the default value is 1.

Alternatively, the number of PDSCH slot-based repetitions for generating the semi-static HARQ-ACK codebook can be a fixed value, which can be configured by high layer signaling or specified by standard specifications as, for example, 8.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
  if the UE is provided tdd-UL-DL-ConfigurationCommon, or tdd-UL-DL-
  ConfigurationDedicated, for each slot from slot ⌊(n_U − K_{1,k})·2^{μDL−μUL}⌋+ n_D − N_{PDSCH}^{repeat} +1 to
  slot ⌊(n_U − K_{1,k})·2^{μDL−μUL}⌋+ n_D, at least one OFDM symbol of the PDSCH time-domain
  resource derived by row r is configured as uplink, where K_{1,k} is the k-th value of the
  set K_1,
                R=R\r ;
  else
                r = r + 1;
  end if
end while
```

$N_{PUSCH}^{repeat}$ can be equal to the maximum value of the following two values:
  a) the maximum value among pdsch-AggregationFactor values configured in all SPS-Config(s).
  b) pdsch-AggregationFactor value configured in PDSCH-Config.

This method specifies how to generate a semi-static HARQ-ACK codebook in the case where the number of PDSCH slot-based repetitions, pdsch-AggregationFactor, is configured in one or more SPS-Configs and/or the number of PDSCH slot-based repetitions, pdsch-AggregationFactor, is configured in PDSCH-Config, which ensures that the UE may include HARQ-ACK feedback information for the received PDSCH(s) in the semi-static HARQ-ACK codebook under different configurations, and thus improves reliability of the HARQ-ACK codebook.

In another embodiment, optionally, the UE is provided one or more activated SPS PDSCH configurations in a serving cell c. Optionally, a SPS PDSCH configuration i may be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config may be the same or different. When a SPS PDSCH configuration i is activated by a DCI format, for example, DCI format 1_2 or DCI format 1_1, and if the SPS PDSCH configuration i is configured with the number of repetitive transmission times between slots, pdsch-AggregationFactor, in SPS-Config, then the number of PDSCH slot-based repetitions of the SPS PDSCH configuration i is the number of PDSCH slot-based repetitions, pdsch-AggregationFactor, configured in SPS-Config, otherwise the number of PDSCH slot-based repetitions of the SPS PDSCH configuration i is the number of PDSCH slot-based repetitions, pdsch-AggregationFactor, configured in PDSCH-Config. The pdsch-AggregationFactor in PDSCH-Config can be configured as 2, 4 or 8, and if not configured, pdsch-AggregationFactor is defaulted as 1. The pdsch-AggregationFactor in SPS-Config can be configured as 1, 2, 4 or 8.

The UE may be provided the parameter RepNumR16, which is a configurable parameter, and is used to dynamically indicate the number of PDSCH slot-based repetitions. This parameter is indicated by a time-domain resource assignment field in DCI.

In the case of a semi-static HARQ-ACK codebook, such as the 3GPP TS 38.213 Type-1 HARQ-ACK codebook, since pdsch-AggregationFactor values configured in different SPS-Configs may be different, pdsch-AggregationFactor values of SPS PDSCH and dynamically scheduled PDSCH configuration may also be different. All values of pdsch-AggregationFactor need to be considered to generate the semi-static HARQ-ACK codebook.

The number of PDSCH slot-based repetitions for generating the semi-static HARQ-ACK codebook can be determined as a value by standard specifications or high layer signaling. standard specifications In particular, the number of PDSCH slot-based repetitions for generating the semi-static HARQ-ACK codebook can be equal to the maximum value of the following three values, or can be equal to one of the following three values:

a) the maximum value among the pdsch-AggregationFactor values configured in all SPS-Configs.
b) pdsch-AggregationFactor value configured in PDSCH-Config.
c) the maximum value among all configured RepNumR16 values.

It should be noted that if one of the above is not configured, the default value is 1.

Alternatively, the number of PDSCH slot-based repetitions for generating the semi-static HARQ-ACK codebook may be a fixed value, which may be configured by high layer signaling or specified by standard specifications as, for example, 8.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
    if the UE is provided tdd-UL-DL-ConfigurationCommon, or tdd-UL-DL-
    ConfigurationDedicated, for each slot from slot ⌊(n_U − K_{1,k})·2^{μDL−μUL}⌋+ n_D − N_{PDSCH}^{repeat} +1 to
    slot ⌊(n_U − K_{1,k})·2^{μDL−μUL}⌋+ n_D, at least one OFDM symbol of the PDSCH time-domain
    resource derived by row r is configured as uplink, where K_{1,k} is the k-th value in set
    K_1,
        R=R\r ;
    else
        r = r + 1;
    end if
end while
```

$N_{PUSCH}^{repeat}$ can be equal to the maximum value of the following three values:

a) the maximum value among the pdsch-AggregationFactor values configured in all SPS-Configs.
b) pdsch-AggregationFactor value configured in PDSCH-Config.
c) the maximum value among all configured RepNumR16 values.

This method specifies how to generate a semi-static HARQ-ACK codebook in the case where the number of PDSCH slot-based repetitions, pdsch-AggregationFactor, is configured in one or more SPS-Configs, and/or the number of PDSCH slot-based repetitions, pdsch-AggregationFactor, is configured in PDSCH-Config, and/or RepNumR16 is configured in the time-domain resource assignment table, which ensures that the UE may include HARQ-ACK feedback information for the received PDSCH in the semi-static HARQ-ACK codebook under different configurations, and thus improves reliability of the HARQ-ACK codebook.

In another embodiment, the UE may be provided the parameter RepNumR16, which is a configurable parameter, and is used to dynamically indicate the number of PDSCH slot-based repetitions. This parameter is indicated by a time-domain resource assignment field in DCI.

In the case of a semi-static HARQ-ACK codebook, such as the 3GPP TS 38.213 Type-1 HARQ-ACK codebook, the number of PDSCH slot-based repetitions for generating the semi-static HARQ-ACK codebook may be configured as a value by standard specifications or high layer signaling. In particular, the number of PDSCH slot-based repetitions for generating the semi-static HARQ-ACK codebook can be equal to the maximum value of the following two values, or can be equal to one of the following two values:

a) pdsch-AggregationFactor value configured in PDSCH-Config.
b) the maximum value among all configured RepNumR16 values.

It should be noted that if one of the above is not configured, the default value is 1.

Alternatively, the number of PDSCH slot-based repetitions for generating the semi-static HARQ-ACK codebook can be a fixed value, which can be configured by high layer signaling or specified by standard specifications as, for example, 8.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
   if the UE is provided tdd-UL-DL-ConfigurationCommon, or tdd-UL-DL-
   ConfigurationDedicated, for each slot from slot ⌊(n_U − K_{1,k})·2^{μDL-μUL}⌋+ n_D − N_{PDSCH}^{repeat} +1 to
   slot ⌊(n_U − K_{1,k})·2^{μDL-μUL}⌋+ n_D, at least one OFDM symbol of the PDSCH time-domain
   resource derived by row r is configured as uplink, where K_{1,k} is the k-th value in set
   K_1,
          R=R\r ;
   else
          r = r + 1;
       end if
   end while
```

$N_{PUSCH}^{repeat}$ can be equal to the maximum value of the following two values:

a) pdsch-AggregationFactor value configured in PDSCH-Config.

b) the maximum value among all configured RepNumR16 values.

This method specifies how to generate a semi-static HARQ-ACK codebook in the case where the number of PDSCH slot-based repetitions, pdsch-AggregationFactor, is configured in PDSCH-Config, and/or RepNumR16 is configured in the time-domain resource assignment table, which ensures that the UE may contain HARQ-ACK feedback information for the received PDSCH in the semi-static HARQ-ACK codebook under different configurations, and thus improves reliability of the HARQ-ACK codebook.

In another embodiment, optionally, the UE is provided one or more activated SPS PDSCH configurations in a serving cell c. Optionally, a SPS PDSCH configuration i (i is a non-negative integer) may be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config may be the same or different. When a SPS PDSCH configuration i is activated by a DCI format, for example, DCI format 1_2 or DCI format 1_1, and if the SPS PDSCH configuration i is configured with the number of repetitive transmission times between slots, pdsch-AggregationFactor, in SPS-Config, then the number of PDSCH slot-based repetitions of the SPS PDSCH configuration i is the number of PDSCH slot-based repetitions, pdsch-AggregationFactor, configured in SPS-Config, otherwise the number of PDSCH slot-based repetitions of the SPS PDSCH configuration i is the number of PDSCH slot-based repetitions, pdsch-AggregationFactor, configured in PDSCH-Config. The pdsch-AggregationFactor in PDSCH-Config may be configured as 2, 4 or 8, and if not configured, pdsch-AggregationFactor is equal to 1 by default. The pdsch-AggregationFactor in SPS-Config may be configured as 1, 2, 4 or 8.

Optionally, the UE may be provided the parameter RepNumR16, which is a configurable parameter, and is used to dynamically indicate the number of PDSCH slot-based repetitions. This parameter is indicated by a time-domain resource assignment field in DCI.

In the case of a semi-static HARQ-ACK codebook, such as the 3GPP TS 38.213 Type-1 HARQ-ACK codebook, since pdsch-AggregationFactor values configured in different SPS-Configs may be different, pdsch-AggregationFactor values of SPS PDSCH and dynamically scheduled PDSCH configuration may also be different. All values of pdsch-AggregationFactor need to be considered to generate the semi-static HARQ-ACK codebook.

The number of PDSCH slot-based repetitions for generating the semi-static HARQ-ACK codebook can be determined as a value by standard specifications or high layer signaling. In particular, the number of PDSCH slot-based repetitions for generating the semi-static HARQ-ACK codebook may be a fixed value, which may be configured by high layer signaling or specified by standard specifications as, for example, 1.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
   if the UE is provided tdd-UL-DL-ConfigurationCommon, or tdd-UL-DL-
   ConfigurationDedicated, for each slot from slot ⌊(n_U − K_{1,k})·2^{μDL-μUL}⌋+ n_D − N_{PDSCH}^{repeat} +1 to
   slot ⌊(n_U − K_{1,k})·2^{μDL-μUL}⌋+ n_D, at least one OFDM symbol of the PDSCH time-domain
   resource derived by row r is configured as uplink, where K_{1,k} is the k-th value in set
   K_1,
          R=R\r ;
   else
          r = r + 1;
       end if
   end while
```

$N_{PUSCH}^{repeat}$ may be specified by standard specifications as 1. Alternatively, $N_{PUSCH}^{repeat}$ may also be configured by higher layer signaling as 1.

In the case where slot-based repetitive transmission of PDSCH is scheduled, the PDSCH may be a dynamically scheduled PDSCH or SPS PDSCH, and a slot interval K1 between PDSCH and PUCCH may be defined as a slot interval between a last PDSCH repetitive transmission instance determined according to high layer signaling and PUCCH. The high layer signaling herein may be Radio Resource Control, RRC signaling, for example, semi-static uplink and downlink frame-structure configuration signaling. The high layer signaling herein does not include physical layer signaling, for example, DCI. SPS PDSCH #1 is taken as an example (but not limited thereto) below for specific description. For example, the number of slot-based repetitions of an activated SPS PDSCH #1 is 4; a first repetitive transmission instance of SPS PDSCH #1 is located in slot 0; a frame structure configured by the semi-static uplink and downlink frame-structure configuration signaling is that slot 0 is all downlink; slot 1 is all flexible symbols. Slots 2 and 3 are all uplink. Downlink data may be transmitted on downlink symbols and/or flexible symbols, while cannot be transmitted on uplink symbols. At this time, a last repetitive transmission instance of SPS PDSCH #1 determined according to high layer signaling is located in slot 1. Slot 2 and slot 3 cannot transmit downlink data since they are uplink slots. When a dynamic SFI (Slot Format Indicator) indicates that slot 1 is uplink, the UE will not receive SPS PDSCH #1 in slot 1, and at this time, the UE may determine a slot for PUCCH transmitting HARQ-ACK of SPS PDSCH #1 according to SPS PDSCH #1 possibly received in slot 1 and K1. For example, when SCSs of an uplink slot and a downlink slot are the same, the slot for PUCCH transmitting HARQ-ACK of SPS PDSCH #1 is 1+K1. UE determines a position of SPS PDSCH #1 in the 3GPP TS 38.213 Type-1 HARQ-ACK codebook according to SPS PDSCH #1 possibly received in slot 1. In particular, the position of SPS PDSCH #1 in the 3GPP TS 38.213 Type-1 HARQ-ACK codebook is determined by positions of OFDM symbols of SPS PDSCH #1 possibly received in slot 1.

This method specifies how to generate a semi-static HARQ-ACK codebook in the case where the number of PDSCH slot-based repetitions, pdsch-AggregationFactor, is configured in one or more SPS-Configs, and/or the number of PDSCH slot-based repetitions, pdsch-AggregationFactor, is configured in PDSCH-Config, which ensures that the UE may include HARQ-ACK feedback information for the received PDSCH in the semi-static HARQ-ACK codebook under different configurations, and thus improves reliability of the HARQ-ACK codebook. This method avoids impact of missed detection of physical layer signaling (for example, missed detection of DCI) on reliability of the semi-static HARQ-ACK codebook. Compared with determining the slot of PUCCH and its position in the semi-static HARQ-ACK codebook according to a last PDSCH transmission instance actually received, this method may guarantee a consistent understanding of the codebook between the UE and the base station, and guarantee that the UE transmits the HARQ-ACK codebook in the slot of PUCCH expected by the base station.

In another embodiment, optionally, UE is provided one or more activated SPS PDSCH configurations in a serving cell c. Optionally, a SPS PDSCH configuration i (i is a non-negative integer) may be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config may be the same or different.

The UE may also be provided the parameter RepNumR16, which is a configurable parameter, and is used to dynamically indicate the number of PDSCH slot-based repetitions. This parameter is indicated by a time-domain resource assignment field in DCI.

When a SPS PDSCH configuration i is activated by a DCI format, for example, DCI format 1_2 or DCI format 1_1, the number of PDSCH slot-based repetitions of the SPS PDSCH configuration i is the value of RepNumR16 indicated in the activated DCI.

When a SPS PDSCH configuration i is activated by another DCI format, for example, DCI format 1_0, the number of PDSCH slot-based repetitions of the SPS PDSCH configuration i is 1.

In the case of a semi-static HARQ-ACK codebook, for example, the 3GPP TS 38.213 Type-1 HARQ-ACK codebook, the number of PDSCH slot-based repetitions for generating the semi-static HARQ-ACK codebook can be determined as a value by standard specifications or high layer signaling. In particular, the number of PDSCH slot-based repetitions for generating the semi-static HARQ-ACK codebook may be a fixed value, which may be configured by high layer signaling or specified by standard specifications as, for example, 1.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
if the UE is provided tdd-UL-DL-ConfigurationCommon, or tdd-UL-DL-
ConfigurationDedicated, for each slot from slot ⌊(n_U − K_{1,k})·2^{μDL−μUL}⌋+ n_D − N_{PDSCH}^{repeat} +1 to
slot ⌊(n_U − K_{1,k})·2^{μDL−μUL}⌋+ n_D, at least one OFDM symbol of the PDSCH time-domain
resource derived by row r is configured as uplink, where K_{1,k}, is the k-th value in set
K_1,
         R=R\r ;
else
         r = r + 1;
    end if
end while
```

$N_{PUSCH}^{repeat}$ may be specified by standard specifications as 1. Alternatively, $N_{PUSCH}^{repeat}$ may also be configured by higher layer signaling as 1.

In the case where slot-based repetitive transmission of PDSCH is scheduled, the PDSCH may be a dynamically scheduled PDSCH or SPS PDSCH, and a slot interval K1 between PDSCH and PUCCH may be defined as a slot interval between a last PDSCH repetitive transmission instance determined according to high layer signaling and PUCCH. The high layer signaling herein may be Radio Resource Control, RRC signaling, for example, semi-static uplink and downlink frame-structure configuration signaling. The high layer signaling herein does not include physical layer signaling, for example, DCI. SPS PDSCH #1 is taken as an example (but not limited thereto) below for specific description. For example, the number of PDSCH slot-based repetitions of an activated SPS PDSCH #1 is 4; a first repetitive transmission instance of SPS PDSCH #1 is located in slot 0; a frame structure configured for the semi-static uplink and downlink frame-structure configuration signaling is that slot 0 is all downlink; slot 1 is all flexible symbols. Slots 2 and 3 are all uplink. Downlink data may be transmitted on downlink symbols and/or flexible symbols, while cannot be transmitted on uplink symbols. At this time, a last repetitive transmission instance of SPS PDSCH #1 determined according to high layer signaling is located in slot 1. Slot 2 and slot 3 cannot transmit downlink data since they are uplink slots. When a dynamic SFI (Slot Format Indicator) indicates that slot 1 is uplink, the UE will not receive SPS PDSCH #1 in slot 1, and at this time, the UE may determine a slot of PUCCH transmitting HARQ-ACK of SPS PDSCH #1 according to SPS PDSCH #1 possibly received in slot 1 and K1. For example, when SCSs of an uplink slot and a downlink slot are the same, the slot of PUCCH transmitting HARQ-ACK of SPS PDSCH #1 is 1+K1. The UE determines a position of SPS PDSCH #1 in the 3GPP TS 38.213 Type-1 HARQ-ACK codebook according to SPS PDSCH #1 possibly received in slot 1. In particular, the position of SPS PDSCH #1 in the 3GPP TS 38.213 Type-1 HARQ-ACK codebook is determined by positions of OFDM symbols of SPS PDSCH #1 possibly received in slot 1.

This method specifies how to generate a semi-static HARQ-ACK codebook in the case where RepNumR16 dynamically indicating the number of PDSCH slot-based repetitions is configured, which ensures that the UE may include HARQ-ACK feedback information for the received PDSCH in the semi-static HARQ-ACK codebook under different configurations, and thus improves reliability of the HARQ-ACK codebook. This method avoids impact of missed detection of physical layer signaling (for example, missed detection of DCI) on reliability of the semi-static HARQ-ACK codebook. Compared with determining the slot of PUCCH and its position in the semi-static HARQ-ACK codebook according to a last PDSCH transmission instance actually received, this method may guarantee a consistent understanding of the codebook between the UE and the base station, and guarantee that the UE transmits the HARQ-ACK codebook in the slot of PUCCH expected by the base station.

In another embodiment, optionally, the UE is provided one or more activated SPS PDSCH configurations in a serving cell c. Optionally, a SPS PDSCH configuration i (i is a non-negative integer) may be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config may be the same or different.

The UE may also be provided the parameter RepNumR16, which is a configurable parameter, and is used to dynamically indicate the number of PDSCH slot-based repetitions. This parameter is indicated by a time-domain resource assignment field in DCI.

When a SPS PDSCH configuration i is activated by a DCI format, for example, DCI format 1_2 or DCI format 1_1, the number of PDSCH slot-based repetitions of the SPS PDSCH configuration i is the value of RepNumR16 indicated in the activating DCI.

When a SPS PDSCH configuration i is activated by another DCI format, for example, DCI format 1_0, the number of PDSCH slot-based repetitions of the SPS PDSCH configuration i is 1.

In the case of a semi-static HARQ-ACK codebook, for example, the 3GPP TS 38.213 Type-1 HARQ-ACK codebook, all values of RepNumR16 need to be considered to generate the semi-static HARQ-ACK codebook.

The number of PDSCH slot-based repetitions for generating the semi-static HARQ-ACK codebook can be determined as a value by standard specifications or high layer signaling. In particular, the number of PDSCH slot-based repetitions for generating the semi-static HARQ-ACK codebook can be equal to the maximum value among all configured RepNumR16 values.

Alternatively, the number of PDSCH slot-based repetitions for generating the semi-static HARQ-ACK codebook can be a fixed value, which can be configured by high layer signaling or specified by standard specifications as, for example, 16.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < 𝒞(R)
if the UE is provided tdd-UL-DL-ConfigurationCommon, or tdd-UL-DL-
ConfigurationDedicated, for each slot from slot ⌊(n_U − K_{1,k})·2^{μDL−μUL}⌋+ n_D − N_{PDSCH}^{repeat} +1 to
slot ⌊(n_U − K_{1,k})·2^{μDL−μUL}⌋+ n_D, at least one OFDM symbol of the PDSCH time-domain
resource derived by row r is configured as uplink, where K_{1,k} is the k-th value in set
K_1,
        R=R\r ;
else
        r = r + 1;
    end if
end while
```

$N_{PUSCH}^{repeat}$ can be equal to the maximum value among all configured RepNumR16 values.

This method specifies how to generate a semi-static HARQ-ACK codebook in the case where the number of PDSCH slot-based repetitions, pdsch-AggregationFactor, is configured in one or more SPS-Configs, and/or the number of PDSCH slot-based repetitions, pdsch-AggregationFactor, is configured in PDSCH-Config, and/or RepNumR16 is configured in the time-domain resource assignment table, which ensures that the UE may include HARQ-ACK feedback information for the received PDSCH in the semi-static HARQ-ACK codebook under different configurations, and thus improves reliability of the HARQ-ACK codebook.

In another embodiment, the UE may be provided the parameter RepNumR16, which is a configurable parameter, and is used to dynamically indicate the number of PDSCH slot-based repetitions. This parameter is indicated by a time-domain resource assignment field in DCI.

Optionally, the UE is provided one or more activated SPS PDSCH configurations in a serving cell c. Optionally, a SPS PDSCH configuration i (i is a non-negative integer) may be configured with the number of PDSCH slot-based repetitions, pdsch-AggregationFactor, in SPS-Config. The number of PDSCH slot-based repetitions, pdsch-AggregationFactor, configured for different SPS PDSCH configurations in SPS-Config may be the same or different. When a SPS PDSCH configuration i is activated by a DCI format, for example, DCI format 1_2 or DCI format 1_1, and if the SPS PDSCH configuration i is configured with the number of repetitive Alternatively, the number of PDSCH slot-based repetitions for generating the semi-static HARQ-ACK codebook may be a fixed value, which may be configured by high layer signaling or specified by standard specifications as, for example, 8.

For example, in pseudo-code of the 3GPP TS 38.213 Type-1 HARQ-ACK codebook, the number of PDSCH slot-based repetitions for generating the semi-static HARQ-ACK codebook is expressed by $N_{PUSCH}^{repeat}$.

```
while r < ℓ(R)
if the UE is provided tdd-UL-DL-ConfigurationCommon, or tdd-UL-DL-
ConfigurationDedicated, for each slot from slot ⌊(n_U − K_{1,k})·2^{μDL−μUL}⌋+ n_D − N_{PDSCH}^{repeat} +1 to
slot ⌊(n_U − K_{1,k})·2^{μDL−μUL}⌋+ n_D, at least one OFDM symbol of the PDSCH time-domain
resource derived by row r is configured as uplink, where K_{1,k}, is the k-th value in set
K_1,
            R=R\r ;
else
         r = r + 1;
      end if
   end while
``` transmission times between slots, pdsch-AggregationFactor, in SPS-Config, then the number of PDSCH slot-based repetitions of the SPS PDSCH configuration i is the number of PDSCH slot-based repetitions, pdsch-AggregationFactor, configured in SPS-Config, otherwise the number of PDSCH slot-based repetitions of the SPS PDSCH configuration i is RepNumR16 indicated in the activating DCI.

Alternatively, when RepNumR16 is indicated in the activated DCI, the number of PDSCH slot-based repetitions of the SPS PDSCH configuration i is RepNumR16 indicated in the activated DCI; otherwise, when RepNumR16 is not indicated in the activated DCI and the SPS PDSCH configuration i is configured with the number of PDSCH slot-based repetitions, pdsch-AggregationFactor, in sps-Config, the number of PDSCH slot-based repetitions of the SPS PDSCH configuration i is the number of PDSCH slot-based repetitions, pdsch-AggregationFactor, configured in SPS-Config.

The pdsch-AggregationFactor in SPS-Config may be configured as 1, 2, 4 or 8.

In the case of a semi-static HARQ-ACK codebook, such as the 3GPP TS 38.213 Type-1 HARQ-ACK codebook, since pdsch-AggregationFactor values configured in different SPS-Configs may be different, pdsch-AggregationFactor values of SPS PDSCH and dynamically scheduled PDSCH configuration may also be different. All values of pdsch-AggregationFactor need to be considered to generate the semi-static HARQ-ACK codebook.

The number of PDSCH slot-based repetitions for generating the semi-static HARQ-ACK codebook can be determined as a value by standard specifications or high layer signaling. In particular, the number of PDSCH slot-based repetitions for generating the semi-static HARQ-ACK codebook can be equal to the maximum value of the following two values, or can be equal to one of the following two values:
  a) the maximum value among the pdsch-AggregationFactor values configured in all SPS-Configs.
  b) the maximum value among all configured RepNumR16 values.

It should be noted that if one of the above is not configured, the default value is 1.

$N_{PUSCH}^{repeat}$ can be equal to the maximum value of the following two values:
  a) the maximum value among the pdsch-AggregationFactor values configured in all SPS-Configs.
  b) the maximum value among all configured RepNumR16 values.

This method specifies how to generate a semi-static HARQ-ACK codebook in the case where the number of PDSCH slot-based repetitions, pdsch-AggregationFactor, is configured in one or more SPS-Configs, and/or the number of PDSCH slot-based repetitions, pdsch-AggregationFactor, is configured in PDSCH-Config, and/or RepNumR16 is configured in the time-domain resource assignment table, which ensures that the UE may include HARQ-ACK feedback information for the received PDSCH in the semi-static HARQ-ACK codebook under different configurations, and thus improves reliability of the HARQ-ACK codebook.

It should be noted that, in all embodiments of the present disclosure, values of RepNumR16 configured in different DCI formats may be different, and the maximum value among all configured RepNumR16 values may be the maximum value among RepNumR16 values configured in all DCI formats.

In another embodiment, for UCI less than or equal to 11 bits, that is, $O_{ACK}+O_{SR}+O_{CSI}≤11$, $n_{HARQ-ACK}(i)$ would be determined for PUCCH transmission using PUCCH format 2, PUCCH format 3 or PUCCH format 4, where $n_{HARQ-ACK}(i)$ is HARQ-ACK information bits for power control in PUCCH transmission time unit i. $O^{ACK}$ is the number of information bits of HARQ-ACK codebook; $O_{SR}(i)$ is the number of information bits of SR; and $O_{CSI}(i)$ is the number of information bits of CSI. At this time, the number of bits for UCI is greater than 2 and less than or equal to 11, and PUCCH employs RM (Reed-Muller) encoding. When $O_{SR}(i)$ and $O_{CSI}(i)$ are both 0, and if $n_{HARQ-ACK}(i)=0$, it will cause an existing equation for power calculation to take the logarithm of a negative number, where $O_{SR}(i)$ is the number of information bits of SR; and $O_{CSI}(i)$ is the number of information bits of CSI. It should be noted that $n_{HARQ-ACK}(i)$ may be different from the number of information bits in the HARQ-ACK codebook. For example, when the UE is configured to receive 3 activated SPS PDSCHs and these 3 SPS PDSCHs are canceled by a dynamic SFI, the HARQ-ACK codebook at this time has a size of 3 bits and are all NACKs; and for SPS PDSCHs, $n_{HARQ-ACK}(i)$ is the number of SPS PDSCHs received by the UE and is 0 at this time. In order to solve this problem, the following methods are available.

A first method: set a minimum value N0 for $n_{HARQ\text{-}ACK}(i)$, where N0 can be greater than 0, for example, N0=1. In particular, $$n_{HARQ\text{-}ACK}(i)=\max\{n_{HARQ\text{-}ACK}(i),N0\}$$

where max { } means to take the maximum value of parameters in { }. Alternatively, if $n_{HARQ\text{-}ACK}(i)=0$, $n_{HARQ\text{-}ACK}(i)=N0$.

A second method: if both $O_{SR}(i)$ and $O_{CSI}(i)$ are 0, or $O_{SR}(i)+O_{CSI}(i)$ is 0, set a minimum value N0 for $n_{HARQ\text{-}ACK}(i)$, where N0 can be greater than 0, for example, N0=1. In particular, $$n_{HARQ\text{-}ACK}(i)=\max\{n_{HARQ\text{-}ACK}(i),N0\}$$

Alternatively, if $n_{HARQ\text{-}ACK}(i)$, $O_{SR}(i)$ and $O_{CSI}(i)$ are all 0, $n_{HARQ\text{-}ACK}(i)=N0$.

Alternatively, if $n_{HARQ\text{-}ACK}(i)+O_{SR}(i)+O_{CSI}(i)$ is 0, $n_{HARQ\text{-}ACK}(i)=N0$.

A third method: set a minimum value M0 for $\Delta_{TF,b,f,c}(i)$, $\Delta_{TF,b,f,c}(i)$ is a PUCCH transmission power adjustment element of an active uplink BWP of a main carrier c. In particular, $$\Delta_{TF,b,f,c}(i)=\max\{\Delta_{TF,b,f,c}(i),M0\}$$

Alternatively, if $\Delta_{TF,b,f,c}(i)=0$, $\Delta_{TF,b,f,c}(i)$ $n_{HARQ\text{-}ACK}(i)=M0$.

A fourth method: if $n_{HARQ\text{-}ACK}(i)$, $O_{SR}(i)$ and $O_{CSI}(i)$ are all 0, or $n_{HARQ\text{-}ACK}(i)+O_{SR}(i)+O_{CSI}(i)$ is 0, PUCCH is not transmitted.

A fifth method: when calculating $n_{HARQ\text{-}ACK}(i)$, even if a SPS PDSCH is cancelled by a dynamic SFI or a dynamic scheduling DCI, it is considered that the SPS PDSCH has been received. Alternatively, during calculation of $n_{HARQ\text{-}ACK}(i)$, $N_{SPS,c}$ indicates the number of SPS PDSCHs received, and $N_{SPS,c}$ can be redefined as, the number of SPS PDSCHs of activated SPS PDSCH(s) on serving cell c that UE feeds back corresponding HARQ-ACK information on a same PUCCH.

This embodiment provides various methods for power control when $n_{HARQ\text{-}ACK}(i)$ is 0. The first method, the third method, the fourth method and the fifth method are relatively easy to implement and have little impact on standard specifications. Compared with the first method, the second method further improves efficiency of power control. When not both $O_{SR}(i)$ and $O_{CSI}(i)$ are 0, $n_{HARQ\text{-}ACK}(i)$ can be 0, which may reduce a transmission power of the UE. The minimum value in this embodiment may be specified by standard specifications or may be configured by high layer signaling.

In another embodiment, a DCI format may indicate secondary cell(s) dormancy. If the 3GPP TS 38.213 Type-2 HARQ-ACK codebook is transmitted on PUCCH, for UCI less than or equal to 11 bits, that is, $O_{ACK}+O_{SR}+O_{CSI} \leq 11$ $n_{HARQ\text{-}ACK}$ would be determined for PUCCH transmission using PUCCH format 2, PUCCH format 3 or PUCCH format 4, where $n_{HARQ\text{-}ACK}$ is the number of HARQ-ACK information bits related to PUCCH power control. $O^{ACK}$ is the number of bits in the HARQ-ACK codebook; $O_{SR}(i)$ is the number of information bits of SR; and $O_{CSI}(i)$ is the number of information bits of CSI. In the case where no serving cell is configured with CBG (code block group) retransmission, $n_{HARQ\text{-}ACK}$ is determined by the following equation.

$$n_{HARQ\text{-}ACK} = n_{HARQ\text{-}ACK,TB} = \left(\left(V_{DAI,m_{last}}^{DL} - \sum_{c=0}^{N_{cells}^{DL}-1} U_{DAI,c}\right)\bmod(T_D)\right)N_{TB,max}^{DL} + \sum_{c=0}^{N_{cells}^{DL}-1}\left(\sum_{m=0}^{M-1} N_{m,c}^{received} + N_{SPS,c}\right)$$

where $T_D=2^{N_{C\text{-}DAI}^{DL}}$, $N_{C\text{-}DAI}^{DL}$ the number of bits for C-DAI.

if $N_{cells}^{DL}=1$, $V_{DAI,m_{last}}^{DL}$ is the value of C-DAI in the last DCI format scheduling PDSCH reception, indicating SPS PDSCH release for any serving cell c or indicating secondary cell dormancy for any serving cell c that the UE detects within the M PDCCH monitoring occasions.

if $N_{cells}^{DL}>1$ if the UE does not detect any DCI format that includes a T-DAI field in a last PDCCH monitoring occasion within the M PDCCH monitoring occasions, and the UE detects at least one DCI format scheduling PDSCH reception or indicating SPS PDSCH release for any serving cell c, $V_{DAI,m_{last}}^{DL}$ is the value of C-DAI in a DCI format received by the UE in the last PDCCH monitoring occasion within the M PDCCH monitoring occasions.

if the UE detects a DCI format that includes a T-DAI field in a last PDCCH monitoring occasion within the M PDCCH monitoring occasions, and the UE detects at least one DCI format scheduling PDSCH reception, indicating SPS PDSCH release for any serving cell c, or indicating secondary cell dormancy for any serving cell c, $V_{DAI,m_{last}}^{DL}$ is the value of T-DAI in DCI received by the UE in the last PDCCH monitoring occasion within the M PDCCH monitoring occasions.

$V_{DAI,m_{last}}^{DL}=0$ if the UE does not detect any DCI format scheduling PDSCH reception, indicating SPS PDSCH release for any serving cell C, or indicating secondary cell dormancy for any serving cell c in any of the M PDCCH monitoring occasions.

$U_{DAI,c}$ is the total number of a DCI format scheduling PDSCH reception or indicating SPS PDSCH release, or indicating secondary cell dormancy for any serving cell c that the UE detects within the PDCCH monitoring occasions for serving cell c. $U_{DAI,c}=0$ if the UE does not detect any DCI format scheduling PDSCH reception, indicating SPS PDSCH release, or indicating any secondary cell dormancy for serving cell c in any of the M PDCCH monitoring occasions.

$N_{TB,max}^{DL}=2$ if the value of maxNrofCodeWordsScheduledByDCI is 2 and parameter harq-ACK-SpatialBundlingPUCCH is not provided; otherwise, $N_{TB,max}^{DL}=1$.

$N_{m,c}^{received}$ is the number of TBs scheduled by a DCI format received for serving cell c in PDCCH monitoring occasion m if harq-ACK-SpatialBundlingPUCCH is not provided, or the number of PDSCHs scheduled by a DCI format received for serving cell c in PDCCH monitoring occasion m if harq-ACK-SpatialBundlingPUCCH is provided. $N_{m,c}^{received}$ may be the number of DCI formats indicating SPS PDSCH release or the number of DCI formats indicating secondary cell(s) dormancy received for serving cell c in PDCCH monitoring occasion m.

$N_{SPS,c}$ is the number of SPS PDSCHs reception by the UE on serving cell c for which UE feeds back HARQ-ACK information in the same PUCCH.

If serving cell is configured with CBG retransmission, for each PDSCH group, $$n_{HARQ-ACK} = n_{HARQ-ACK,TB} + n_{HARQ-ACK,CBG}$$

$$n_{HARQ-ACK,CBG} = \left(\left(V_{DAI,m_{last}}^{DL} - \sum_{c=0}^{N_{cell}^{DL,CBG}-1} U_{DAI,c}^{CBG}\right) \bmod(T_D)\right) N_{HARQ-ACK,max}^{CBG/TB,max} + \sum_{c=0}^{N_{cells}^{DL}-1} \sum_{m=0}^{M-1} N_{m,c}^{received,CBG}$$

where, if $N_{cells}^{DL}=1$, $V_{DAL,m_{last}}^{DL}$ is the value of C-DAI in the last DCI format scheduling CBG-based PDSCH reception that the UE detects within the M PDCCH monitoring occasions.

if $N_{cells}^{DL}>1$, $V_{DAL,m_{last}}^{DL}$ is the value of T-DAI in the last DCI format scheduling CBG-based PDSCH reception that the UE detects within the M PDCCH monitoring occasions.

$V_{DAL,m_{last}}^{DL}=0$ if the UE does not detect any DCI format scheduling CBG-based PDSCH reception in any of the M PDCCH monitoring occasions.

$U_{DAI,c}^{CBG}$ is the number of DCI formats scheduling CBG-based PDSCH reception that the UE detects within the M PDCCH monitoring occasions for serving cell c. $U_{DAI,c}^{CBG}=0$ if the UE does not detect any DCI format scheduling CBG-based PDSCH reception for serving cell c in any of the M PDCCH monitoring occasions.

$N_{m,c}^{received,CBG}$ is the number of CBGs in a CBG-based PDSCH scheduled by a DCI format received in PDCCH monitoring occasion m for serving cell c, and the scheduled PDSCH feeds back HARQ-ACK information in a same PUCCH.

In this embodiment, DCI format(s) indicating secondary cell(s) dormancy is counted during calculation of $n_{HARQ-ACK}$, which improves performance of PUCCH power control, guarantees a consistent understanding of PUCCH transmission power between the base station and the UE, and improves reliability of the HARQ-ACK codebook.

It should be noted that $N_{cells}^{DL}$ is the number of configured downlink carriers. In this embodiment, the judgment condition "if $N_{cells}^{DL}=1$" can be replaced with "if no downlink DCI format includes a T-DAI field"; the judgment condition "if $N_{cells}^{DL}>1$" can be replaced with "if at least one downlink DCI format includes a T-DAI field" or "otherwise". Alternatively, the judgment condition "if $N_{cells}^{DL}=1$" in this embodiment may be replaced with "if no downlink DCI format includes a T-DAI field of a scheduled PDSCH group"; the judgment condition "if $N_{cells}^{DL}>1$" can be replaced with "If at least one downlink DCI format includes a T-DAI field of a scheduled PDSCH group" or "otherwise". Alternatively, the judgment condition "if $N_{cells}^{DL}=1$" in this embodiment can replaced with "if $N_{cells}^{DL}>1$, NFI-TotalDAI-Included-r16 is not configured and the UE is not provided CORESETPoolIndex, or the UE is provided CORESETPoolIndex and the value of CORESETPoolIndex is the same for all CORESETs, or the UE is not provided ACKNACKFeedbackMode=JointFeedback; the judgment condition "if $N_{cells}^{DL}>1$" can be replaced with "otherwise". It should be noted that the above judgment conditions are not only applicable to a TB HARQ-ACK sub-codebook, but optionally also applicable to a CBG HARQ-ACK sub-codebook.

$V_{DAI,m_{last}}^{DL}$ may also be determined by the following ways, if the UE does not detect any DCI format that includes a T-DAI field in a last PDCCH monitoring occasion within the M PDCCH monitoring occasions, and at least one DCI format scheduling PDSCH reception or indicating SPS PDSCH release for any serving cell c, $V_{DAI,m_{last}}^{DL}$ is the value of C-DAI in a DCI format received by the UE in the last PDCCH monitoring occasion within the M PDCCH monitoring occasions.

if the UE detects a DCI format that includes a T-DAI field in a last PDCCH monitoring occasion within the M PDCCH monitoring occasions, and at least one DCI format scheduling PDSCH reception or indicating SPS PDSCH release for any serving cell c, or indicating secondary cell dormancy for any serving cell c, $V_{DAI,m_{last}}^{DL}$ is the value of T-DAI in DCI received by the UE in the last PDCCH monitoring occasion within the M PDCCH monitoring occasions.

$V_{DAI,m_{last}}^{DL}=0$ if the UE does not detect any DCI format scheduling PDSCH reception, indicating SPS PDSCH release for any serving cell c, or indicating secondary cell dormancy for any serving cell c in any of the M PDCCH monitoring occasions. $V_{DAI,m_{last}}^{DL}$ may also be determined by the following ways, if the UE does not detect any DCI format that includes a T-DAI field of a scheduled PDSCH group in a last PDCCH monitoring occasion within the M PDCCH monitoring occasions, and at least one DCI format scheduling PDSCH reception or indicating SPS PDSCH release for any serving cell c, $V_{DAI,m_{last}}^{DL}$ is the value of C-DAI in a DCI format received by the UE in the last PDCCH monitoring occasion within the M PDCCH monitoring occasions.

if the UE detects a DCI format that includes a T-DAI field of a scheduled PDSCH group in a last PDCCH monitoring occasion within the M PDCCH monitoring occasions, and at least one DCI format scheduling PDSCH reception, indicating SPS PDSCH release for any serving cell C, or indicating secondary cell dormancy for any serving cell c, $V_{DAI,m_{last}}^{DL}$ is the value of T-DAI of the scheduled PDSCH group in DCI received by the UE in the last PDCCH monitoring occasion within the M PDCCH monitoring occasions.

$V_{DAI,m_{last}}^{DL}=0$ if the UE does not detect any DCI format scheduling PDSCH reception, indicating SPS PDSCH release for any serving cell c, or indicating secondary cell dormancy for any serving cell c in any of the M PDCCH monitoring occasions. $V_{DAI,m_{last}}^{DL}$ may also be determined by the following ways, if $N_{cells}^{DL}=1$, $V_{DAI,m_{last}}^{DL}$ is the value of C-DAI in the last DCI format scheduling PDSCH reception, indicating SPS PDSCH release for any serving cell c or indicating secondary cell dormancy for any serving cell c that the UE detects within the M PDCCH monitoring occasions.

if $N_{cells}^{DL}>1$ if the UE does not detect any DCI format that includes a T-DAI field of a scheduled PDSCH group in a last PDCCH monitoring occasion within the M PDCCH monitoring occasions, and at least one DCI format scheduling PDSCH reception or indicating SPS PDSCH release for any serving cell c, $V_{DAI,m_{last}}^{DL}$ is the value of C-DAI in a DCI format received by the UE in the last PDCCH monitoring occasion within the M PDCCH monitoring occasions.

if the UE detects a DCI format that includes a T-DAI field of a scheduled PDSCH group in a last PDCCH monitoring occasion within the M PDCCH monitoring occasions, and at least one DCI format scheduling PDSCH reception, indicating SPS PDSCH release for any serving cell c, or indicating secondary cell dormancy for any serving cell c, $V_{DAI,m_{last}}^{DL}$ is the value of T-DAI of the scheduled PDSCH group in DCI received by the UE in the last PDCCH monitoring occasion within the M PDCCH monitoring occasions.

$V_{DAI,m_{last}}^{DL}=0$ if the UE does not detect any DCI format scheduling PDSCH reception, indicating SPS PDSCH release for any serving cell C, or indicating secondary cell dormancy for any serving cell c in any of the M PDCCH monitoring occasions.

By modifying the judgment conditions, accuracy of the value of $V_{DAI,m_{last}}^{DL}$ may be guaranteed under different configurations, which improves performance of PUCCH power control, guarantees a consistent understanding of PUCCH transmission power between the base station and the UE, and improves reliability of the HARQ-ACK codebook. When $N_{cells}^{DL}=1$, if there are 2 PDSCH groups, DCI format 1_1 may include only T-DAI of an unscheduled PDSCH group. This solution specifies that T-DAI during power calculation is T-DAI of a scheduled PDSCH group. If T-DAI of the unscheduled PDSCH group is used to calculate power of the scheduled group, the power actually transmitted will be higher or lower than the power that should be transmitted, thereby affecting PUCCH decoding or causing additional power consumption. When $N_{cells}^{DL}=1$, the UE may also receive 2 DCIs in one PDCCH monitoring occasion for one serving cell, and this time, the DCI format may include a T-DAI field. Using T-DAI to calculate $n_{HARQ-ACK}$ may guarantee a consistent understanding of $n_{HARQ-ACK}$ between the base station and the UE, avoid a too low transmission power of the UE due to missed detection of DCI, and improve reliability of PUCCH.

In another embodiment, for an enhanced dynamic HARQ-ACK codebook, for example, the 3GPP TS 38.213 Type-2 HARQ-ACK group codebook, the HARQ-ACK codebook may include HARQ-ACK information for two PDSCH groups.

If the UE is provided pdsch-HARQ-ACK-Codebook=enhancedDynamic-r16, the UE determines HARQ-ACK information multiplexed in one PUCCH transmission occasion according to the following procedure.

Set g to the value of a PDSCH group index field in a last DCI format that provides a value of g and indicates a PUCCH transmission occasion.

Set i(g) to denote a PUCCH transmission occasion for multiplexing HARQ-ACK information. Set k to the value of a PDSCH-to-HARQ_feedback timing field, if any, in a DCI format providing a value of.

If the DCI format does not include a PDSCH-to-HARQ_feedback timing field, set k to the value provided by dl-DataToUL-ACK.

Set h(g) to the value of a first New_Feedback indicator field in the last DCI format providing the value of g.

Set $h^{(g+1) \bmod 2}(g)$ to a value of a second New_Feedback indicator field in the last DCI format providing the value of g.

Set $V_{DAI}^{(g+1) \bmod 2}$ to the value of a T-DAI field for group (g+1)mod 2 in the last DCI format providing the value of g.

If g=1 and the UE detects a DCI format that does not include a PDSCH group index field in a PDCCH reception that is after the PDCCH reception for the last DCI format detection providing the value of g and indicating a same slot for a PUCCH transmission occasion, set $V_{DAI}^{(g+1) \bmod 2}=0$.

Set q to the value of a number of requested PDSCH group(s) field in the last DCI format providing the value of g.

First HARQ-ACK information for PUCCH transmission occasion i(g) is generated according to the method in 3GPP TS 38.213 9.1.3.1, where, the first HARQ-ACK information corresponds only to detections of DCI formats each providing a same value of g, of h(g), and to detections of DCI formats that do not provide a value of g and h(g) and are associated with a same value of g, of h(g), and at least one of the DCI formats providing a value of k indicating the slot. It should be noted that the slot herein may be a slot where the PUCCH transmission occasion i(g) is located.

at least one of the DCI formats provides a h(g) value.

m=0 corresponds to a PDCCH monitoring occasion, where the UE detects a DCI format that provides a value of g or is associated with a value of g, that is the first PDCCH monitoring occasion after a PDCCH monitoring occasion where the UE detects another DCI format that provides a value different than h(g). Alternatively, m=0 corresponds to a PDCCH monitoring occasion, where the UE detects a DCI format that provides a value of g or is associated with a value of g, that is the first PDCCH monitoring occasion after a PDCCH monitoring occasion where the UE detects another DCI format that provides or is associated with a value different than h(g).

The generation of the first HARQ-ACK information for PUCCH transmission occasion i(g) in a slot according to the method in 3GPP TS 38.213 9.1.3.1 excludes the generation of HARQ-ACK information for SPS PDSCH receptions.

If $V_{DAI}^{(g+1) \bmod 2}=0$, $h_{(g+1) \bmod 2}(g)=0$ or $h_{(g+1) \bmod 2}(g)=h((g+1) \bmod 2)$, generate second HARQ-ACK information for PUCCH transmission occasion i((g+1)mod 2) according to the method in 3GPP TS 38.213 9.1.3.1, where the second HARQ-ACK information corresponds only to detections of DCI formats each providing a same value of (g+1)mod 2, of h((g+1)mod 2) and to detections of DCI formats that do not provide a value of (g+1)mod 2, of h((g+1)mod 2), but are associated with a same value of (g+1)mod 2, of h((g+1)mod 2), optionally, at least one of the DCI formats provides a h((g+1)mod 2) value or $h_{(g+1) \bmod 2}(g) \neq 0$, m=0 corresponds to a PDCCH monitoring occasion, where the UE detects a DCI format that provides a value of (g+1)mod 2 or that is associated with a value of (g+1)mod 2, that is the first PDCCH monitoring occasion after a PDCCH monitoring occasion where the UE detects another DCI format that provides a value different than h((g+1)mod 2). Alternatively, m=0 corresponds to a PDCCH monitoring occasion, where the UE detects a DCI format that provides a value of (g+1)mod 2 or that is associated with a value of (g+1)mod 2, that is the first PDCCH monitoring occasion after a PDCCH monitoring occasion where the UE detects another DCI format that provides or is associated with a value different than h((g+1)mod 2), the PUCCH transmission occasion i((g+1)mod 2) is a last one for multiplexing second HARQ-ACK information and it is not after PUCCH transmission occasion i(g), if $V_{DAI}^{(g+1)mod\ 2} \neq 0$, after the completion of the c and m loops for the pseudo-code for the second HARQ-ACK codebook generation in 3GPP TS 38.213 9.1.3.1, set $V_{temp2}=V_{DAI}^{(g+1)mod\ 2}$ for both sub-codebooks, if any; or set $V_{temp2}=V_{DAI}^{(g+1)mod\ 2}$ for currently scheduled HARQ-ACK sub-codebooks, and set $V_{temp2}=V_{DAI}^{(g+1)mod\ 2}$ for both HARQ-ACK sub-codebooks, respectively, and at this time, $V_{DAI}^{(g+1)mod\ 2}$ for the two HARQ-ACK sub-codebooks may be different from each other.

If $h^{(g+1)mod\ 2}(g) \neq 0$ and $h_{(g+1)mod\ 2}(g) \neq h((g+1)mod\ 2)$, generates second HARQ-ACK information as the method described in 3GPP TS 38.213 9.1.3.1 by setting M=0 and, after the completion of the c and m loops for the pseudo-code for the second HARQ-ACK codebook generation in 3GPP TS 38.213 9.1.3.1, setting $V_{temp2}=V_{DAI}^{(g+1)mod\ 2}$.

The generation of the second HARQ-ACK information for PUCCH transmission occasion i((g+1)mod 2) in a slot according to the method in 3GPP TS 38.213 9.1.3.1 excludes the generation of HARQ-ACK information for SPS PDSCH receptions.

If q=0, the PUCCH transmission occasion i(g) includes only the first HARQ-ACK information
    elseif q=1
    if g=1
        the first HARQ-ACK information is after the second HARQ-ACK information in PUCCH transmission occasion i(g)
    else
        the second HARQ-ACK information is after the first HARQ-ACK information in PUCCH transmission occasion i(g)

The UE appends the HARQ-ACK information corresponding to SPS PDSCH receptions, if any, as described in 3GPP TS 38.213 9.1.3.1, after the first and second, if any, HARQ-ACK information.

If a DCI format indicating a slot for a PUCCH transmission occasion does not include a New_Feedback indicator field, a PDSCH reception scheduled by the DCI format is associated with PDSCH group 0 and a value of h(g) associated with the DCI format is set only if h(g) is provided by another DCI format that provides a value of h(g) for PDSCH group 0 and indicates the slot for the PUCCH transmission occasion. It should be noted that the slot for the PUCCH transmission occasion may be the same slot.

It should be noted that the condition "if $V_{DAI}^{(g+1)mod\ 2}=0$ or $h_{(g+1)mod\ 2}(g)=h((g+1)mod\ 2)$" in this embodiment may be replaced by "If $h^{(g+1)mod\ 2}(g)=0$ or $h^{(g+1)mod\ 2}(g)=h((g+1)mod\ 2)$, or g=1 and the UE detects a DCI format that does not include a PDSCH group index field in a PDCCH reception that is after the PDCCH reception carrying the last DCI format detection providing the value of g and the two DCI formats indicates a same PUCCH transmission occasion".

In this solution, there are two methods for generating the second HARQ-ACK information depending on different conditions satisfied. If taking whether $h^{(g+1)mod\ 2}(g)$ is empty as a judgment condition, when g=1 and the UE detects a DCI format that does not include a PDSCH group index field in a PDCCH reception that is after the PDCCH reception carrying the last DCI format detection providing the value of g and the two DCI formats indicates a same PUCCH transmission occasion, the second HARQ-ACK information cannot be correctly generated. The problem is solved in this solution, and reliability of the HARQ-ACK codebook is improved. Furthermore, during the generation of the second HARQ-ACK information, determining the PDCCH monitoring occasion when m=0 by another DCI format associated with different h((g+1)mod 2) values may further improve scheduling flexibility. During the generation of the second HARQ-ACK information, in the case that g=1, $h^{(g+1)mod\ 2}(g) \neq 0$, when the DCI format scheduling PDSCH group 0 does not include a new feedback indicator field, the new feedback indicator for PDSCH group 0 may be determined as $h^{(g+1)mod\ 2}(g)$ according to $h^{(g+1)mod\ 2}(g)$ of the last DCI format, which improves scheduling flexibility.

It should be noted that, in this embodiment, if the UE receives other DCI formats that does not provide a PDSCH group index field after the PDCCH monitoring occasion carrying the last DCI format, which indicates the same PUCCH transmission, the second HARQ-ACK information may be determined by $V_{DAI}^{(g+1)mod\ 2}$ of the last DCI format. For example, g=1, $V_{DAI}^{(g+1)mod\ 2}$ is 4, UE receives another DCI format with C-DAI being 1 after the PDCCH monitoring occasion of the last DCI format, the other DCI format does not provide a PDSCH group index field and the other DCI format indicates the same PUCCH transmission and the DCI format comes, and at this time, the UE can determine that j=1, and the actual number of DCIs that should be fed back is 5.

In another embodiment, for an enhanced dynamic HARQ-ACK codebook, for example, the 3GPP TS 38.213 Type-2 HARQ-ACK group codebook, the HARQ-ACK codebook can include HARQ-ACK information of two PDSCH groups.

For UCI less than or equal to 11 bits, that is, $O^{ACK}+O_{SR}+O_{CSI} \leq 11$, $n_{HARQ-ACK}$ would be determined for PUCCH transmission using PUCCH format 2, PUCCH format 3 or PUCCH format 4, where $n_{HARQ-ACK}$ is the number of HARQ-ACK information bits related to PUCCH power control. $O^{ACK}$ is the number of bits in the HARQ-ACK codebook; $O_{SR}(i)$ is information bits of SR; and $O_{CSI}(i)$ is information bits of CSI.

$$n_{HARQ-ACK} = n_{HARQ-ACK,g} + n_{HARQ-ACK,(g+1)mod2} + \sum_{c=0}^{N_{cells}^{DL}-1} N_{SPS,c}$$

$N_{SPS,c}$ is the number of SPS PDSCHs feeding back HARQ-ACK information in a same PUCCH received by the UE for serving cell c.

In the case where no serving cell is configured with CBG (code block group) retransmission, $n_{HARQ-ACK,g}$ and $n_{HARQ-ACK,(g+1)mod\ 2}$ may be determined by the following equation.

$$n_{HARQ-ACK,g} = n_{HARQ-ACK,g,TB} =$$

$$\left(\left(V_{DAI,m_{last}}^{DL} - \sum_{c=0}^{N_{cells}^{DL}-1} U_{DAI,c}\right)\mod(T_D)\right)N_{TB,max}^{DL} + \sum_{c=0}^{N_{cells}^{DL}-1}\left(\sum_{m=0}^{M-1} N_{m,c}^{received}\right)$$

$$n_{HARQ-ACK}(g+1)\mod 2 = n_{HARQ-ACK}(g+1)\mod 2_{,TB} =$$

$$\left(\left(V_{DAI,m_{last}}^{DL} - \sum_{c=0}^{N_{cells}^{DL}-1} U_{DAI,c}\right)\mod(T_D)\right)N_{TB,max}^{DL} + \sum_{c=0}^{N_{cells}^{DL}-1}\left(\sum_{m=0}^{M-1} N_{m,c}^{received}\right)$$

where $T_D=2^{N_{C\text{-}DAI}^{DL}}$, $N_{C\text{-}DAI}^{DL}$ the number of bits for C-DAI.

For $n_{HARQ\text{-}ACK,g}$, if $N_{cells}^{DL}=1$, $V_{DAI,m_{last}}^{DL}$ is the value of C-DAI in the last DCI format scheduling PDSCH reception, indicating SPS PDSCH release for any serving cell c or indicating secondary cells of any serving cell c dormancy that the UE detects within the M PDCCH monitoring occasions.

if $N_{cells}^{DL}>1$ if the UE does not detect any DCI format that includes a T-DAI field in a last PDCCH monitoring occasion within the M PDCCH monitoring occasions, and at least one DCI format scheduling PDSCH reception or indicating SPS PDSCH release for any serving cell C, $V_{DAI,m_{last}}^{DL}$ is the value of C-DAI in a DCI format received by the UE in the last PDCCH monitoring occasion within the M PDCCH monitoring occasions.

if the UE detects a DCI format that includes a T-DAI field in a last PDCCH monitoring occasion within the M PDCCH monitoring occasions, and at least one DCI format scheduling PDSCH reception, indicating SPS PDSCH release for any serving cell C, or indicating secondary cells of any serving cell c dormancy, $V_{DAI,m_{last}}^{DL}$ is the value of T-DAI in DCI received by the UE in the last PDCCH monitoring occasion within the M PDCCH monitoring occasions.

$V_{DAI,m_{last}}^{DL}=0$ if the UE does not detect any DCI format scheduling PDSCH reception, indicating SPS PDSCH release for any serving cell c, or indicating secondary cells of any serving cell c dormancy in any of the M PDCCH monitoring occasions.

$U_{DAI,c}$ is the total number of a DCI format scheduling PDSCH reception, indicating SPS PDSCH release for any serving cell c, or indicating secondary cells of any serving cell c dormancy that the UE detects within the M PDCCH monitoring occasions for serving cell c. $U_{DAI,c}=0$ if the UE does not detect any DCI format scheduling PDSCH reception, indicating SPS PDSCH release, or indicating any secondary cell dormancy for serving cell c in any of the M PDCCH monitoring occasions.

$N_{TB,max}^{DL}=2$ if the value of maxNrofCodeWordsScheduledByDCI is 2 and parameter harq-ACK-SpatialBundlingPUCCH is not provided; otherwise, $N_{TB,max}^{DL}=1$.

$N_{m,c}^{received}$ is the number of TBs scheduled by a DCI format received for serving cell c in PDCCH monitoring occasion m if harq-ACK-SpatialBundlingPUCCH is not provided, or the number of PDSCHs scheduled by a DCI format received for serving cell c in PDCCH monitoring occasion m if harq-ACK-SpatialBundlingPUCCH is provided. $N_{m,c}^{received}$ may be the number of DCI formats indicating SPS PDSCH release or indicating secondary cells dormancy received for serving cell c in PDCCH monitoring occasion m.

It should be noted that, C-DAI and T-DAI in the above equation correspond to C-DAI and T-DAI of the calculated PDSCH group, unless otherwise specified. Determination of $n_{HARQ\text{-}ACK,(g+1)mod\ 2}$ and $n_{HARQ\text{-}ACK,g}$ differ in that, for $n_{HARQ\text{-}ACK,(g+1)mod\ 2}$, if $V_{DAI}^{(g+1)mod\ 2}\neq 0$, $V_{DAI,m_{last}}^{DL}=V_{DAI}^{(g+1)mod\ 2}$; and if $V_{DAI}^{(g+1)mod\ 2}=0$, determination of $V_{DAI,m_{last}}^{DL}$ is the same as the determination of $n_{HARQ\text{-}ACK,g}$.

It should be noted that if g=1 and the UE detects a DCI format that does not include a PDSCH group index field in a PDCCH reception that is after the PDCCH reception for the last DCI format detection providing the value of g and indicating a same PUCCH transmission occasion, set $V_{DAI}^{(g+1)mod\ 2}=0$. If $V_{DAI}^{(g+1)mod\ 2}\neq 0$, the last DCI format may indicate T-DAI of group (g+1)mod 2, may be determined by the last DCI format that can indicate T-DAI of group (g+1)mod 2. If $V_{DAI}^{(g+1)mod\ 2}=0$, $V_{DAI,m_{last}}^{DL}$ may be determined by T-DAI (if any) scheduling group (g+1)mod 2 or by C-DAI (if T-DAI does not exist).

If any serving cell is configured with CBG retransmission, for each PDSCH group, $$n_{HARQ\text{-}ACK}=n_{HARQ\text{-}ACK,TB}+n_{HARQ\text{-}ACK,CBG}$$

that is, $$n_{HARQ\text{-}ACK,g}=n_{HARQ\text{-}ACK,g,TB}+n_{HARQ\text{-}ACK,g,CBG}$$
$$n_{HARQ\text{-}ACK,(g+1)mod2}=n_{HARQ\text{-}ACK,(g+1)mod2,TB}+n_{HARQ\text{-}ACK,(g+1)mod2,CBG}$$
$$n_{HARQ\text{-}ACK,CBG}=$$
$$\left(\left(V_{DAI,m_{last}}^{DL}-\sum_{c=0}^{N_{cells}^{DL,CBG}-1}U_{DAI,c}^{CBG}\right)mod(T_D)\right)N_{HARQ\text{-}ACK,max}^{CBG/TB,max}+$$
$$\sum_{c=0}^{N_{cells}^{DL}-1}\sum_{m=0}^{M-1}N_{m,c}^{received,CBG}$$

where, if $N_{cells}^{DL}=1$, $V_{DAI,m_{last}}^{DL}$ is the value of C-DAI in the last DCI format scheduling CBG-based PDSCH reception that the UE detects within the M PDCCH monitoring occasions.

if $N_{cells}^{DL}>1$, $V_{DAI,m_{last}}^{DL}$ is the value of T-DAI in the last DCI format scheduling CBG-based PDSCH reception that the UE detects within the M PDCCH monitoring occasions.

$V_{DAI,m_{last}}^{DL}=0$ if the UE does not detect any DCI format scheduling CBG-based PDSCH reception in any of the M PDCCH monitoring occasions.

$U_{DAI,c}^{CBG}$ is the number of DCI formats scheduling CBG-based PDSCH reception that the UE detects within the M PDCCH monitoring occasions for serving cell c. $U_{DAI,c}^{CBG}=0$ if the UE does not detect any DCI format scheduling CBG-based PDSCH reception for serving cell c in any of the M PDCCH monitoring occasions.

$N_{m,c}^{received,CBG}$ is the number of CBGs in a CBG-based PDSCH scheduled by a DCI format received in PDCCH monitoring occasion m for serving cell c, and the scheduled PDSCH feeds back HARQ-ACK information in a same PUCCH.

It should be noted that, DAI in the above equation corresponds to the calculated PDSCH group, unless otherwise specified. Determination of $n_{HARQ\text{-}ACK,(g+1)mod\ 2,CBG}$ and $n_{HARQ\text{-}ACK,g,CBG}$ differ in that, for $n_{HARQ\text{-}ACK,(g+1)mod\ 2,CBG}$, if $V_{DAI}^{(g+1)mod\ 2}\neq 0$, $V_{DAI,m_{last}}^{DL}=V_{DAI}^{(g+1)mod\ 2}$; and if $V_{DAI}^{(g+1)mod\ 2}=0$, determination of $V_{DAI,m_{last}}^{DL}$ is the same as the determination of $n_{HARQ\text{-}ACK,CBG,g}$. $V_{DAI}^{(g+1)mod\ 2}$ herein indicates T-DAI of a CBG HARQ-ACK sub-codebook. T-DAI indicating the CBG HARQ-ACK sub-codebook may be the same as T-DAI indicating a TB HARQ-ACK sub-codebook, or T-DAI indicating the CBG HARQ-ACK sub-codebook may be different from T-DAI indicating a TB HARQ-ACK sub-codebook.

This embodiment designs a method for calculating, for UCI less than or equal to 11 bits, the number of information bits $n_{HARQ\text{-}ACK}$ of the HARQ-ACK codebook related to PUCCH power control for PUCCH transmission using PUCCH format 2, PUCCH format 3 or PUCCH format 4 when two PDSCH groups are scheduled. In this embodiment, differences in $n_{HARQ\text{-}ACK}$ determination between scheduled groups and unscheduled groups are considered, which improves performance of PUCCH power control, guarantees a consistent understanding of PUCCH transmission power between the base station and the UE, and improves reliability of the HARQ-ACK codebook.

In another embodiment, for an enhanced dynamic HARQ-ACK codebook, for example, the 3GPP TS 38.213 Type-2 HARQ-ACK group codebook, the HARQ-ACK codebook can include HARQ-ACK information of two PDSCH groups.

For UCI less than or equal to 11 bits, that is, $O_{ACK} + O_{SR} + O_{CSI} \leq 11$, $n_{HARQ\text{-}ACK}$ would be determined for PUCCH transmission using PUCCH format 2, PUCCH format 3 or PUCCH format 4, where $n_{HARQ\text{-}ACK}$ is the number of HARQ-ACK information bits for PUCCH power control. $O^{ACK}$ is the number of bits in the HARQ-ACK codebook; $O_{SR}(i)$ is the number of information bits of SR; and $O_{CSI}(i)$ is the number of information bits of CSI.

$$n_{HARQ\text{-}ACK} = n_{HARQ\text{-}ACK,g} + n_{HARQ\text{-}ACK,(g+1)\bmod 2}$$

Determination of $n_{HARQ\text{-}ACK,g}$ and $n_{HARQ\text{-}ACK,(g+1)\bmod 2}$ can be performed as described in 3GPP TS 38.213 9.1.3.1, where for $n_{HARQ\text{-}ACK,(g+1)\bmod 2}$, $N_{SPS,c}=0$, and if $V_{DAI}^{(g+1)\bmod 2} \neq 0$, $V_{DAI,m_{last}}^{DL} = V_{DAI}^{(g+1)\bmod 2}$.

Alternatively, determination of $n_{HARQ\text{-}ACK,g}$ and $n_{HARQ\text{-}ACK,(g+1)\bmod 2}$ can be performed as described in 3GPP TS 38.213 9.1.3.1, where for $n_{HARQ\text{-}ACK,g}$, $N_{SPS,c}=0$. For $n_{HARQ\text{-}ACK,(g+1)\bmod 2}$, if $V_{DAI}^{(g+1)\bmod 2} \neq 0$, $V_{DAI,m_{last}}^{DL} = V_{DAI}^{(g+1)\bmod 2}$.

This embodiment can achieve the same technical effect as the previous embodiment. This embodiment reuses the most of existing standard specifications and reduces changes to the standard specifications. In the calculation, the number of SPS PDSCH receptions is grouped into group g, and for group (g+1)mod 2, $N_{SPS,c}=0$ is set. Alternatively, the number of SPS PDSCH receptions is grouped into group (g+1)mod 2, and for group g, $N_{SPS,c}=0$ is set.

Figure 5:
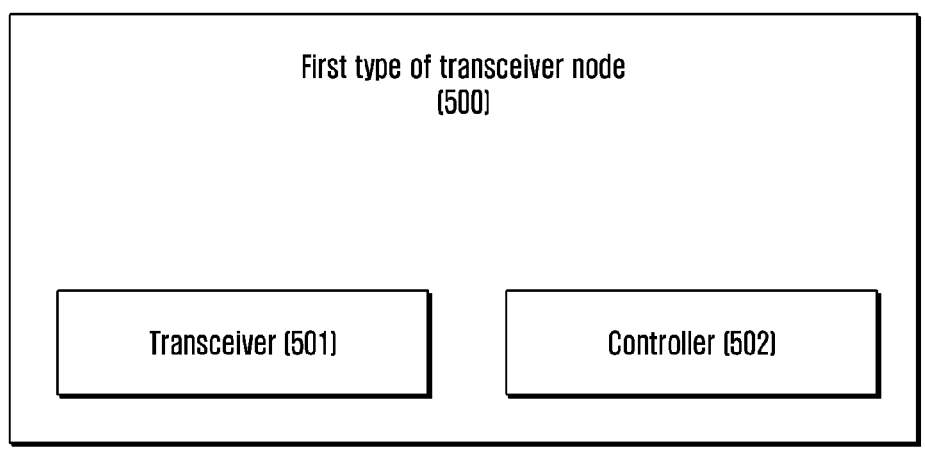
FIG. 5 shows a block diagram of a first type of transceiver node according to an embodiment of the present disclosure.

FIG. 5 shows a block diagram of a first type of transceiver node according to an embodiment of the present disclosure.

Referring to FIG. 5, the first type of transceiver node 500 may include a transceiver 501 and a controller 502.

The transceiver 501 may be configured to transmit a first type of data and/or a first type of control signaling to a second type of transceiver node and receive a HARQ-ACK codebook from the second type of transceiver node in a time unit.

The controller 502 may be a circuit-specific integrated circuit or at least one processor. The controller 102 may be configured to control an overall operation of the first type of transceiver node, including controlling the transceiver 501 to transmit the first type of data and/or the first type of control signaling to the second type of transceiver node and receive the HARQ-ACK codebook from the second type of transceiver node in the determined time unit, and the HARQ-ACK codebook and the time unit are determined by the second type of transceiver node based on the received first type of data and/or the first type of control signaling.

In the following description, BS is taken as an example (but not limited thereto) to describe the first type of transceiver, UE is taken as an example (but not limited thereto) to describe the second type of transceiver node, a downlink time unit (but not limited thereto) is used to describe the first type of time unit, and an upper time unit (but not limited thereto) is used to describe the time unit. Downlink data and/or downlink control signaling (but not limited thereto) are used to describe the first type of data and/or the first type of control signaling. The HARQ-ACK codebook may be included in a second type of control signaling, and uplink control signaling (but not limited thereto) is used to describe the second type of control signaling.

Figure 6:
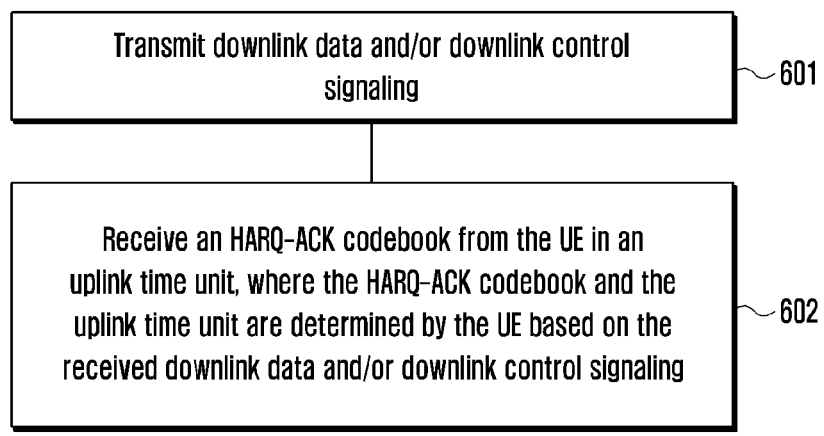
FIG. 6 shows a flowchart of a method performed by BS according to an embodiment of the present disclosure.

FIG. 6 shows a flowchart of a method performed by a BS according to an embodiment of the present disclosure.

First, in step 601, the BS transmits downlink data and/or downlink control signaling to UE.

In step 602, the BS receives a HARQ-ACK codebook from the UE in an uplink time unit, where the HARQ-ACK codebook and the uplink time unit are determined by the UE based on the received downlink data and/or downlink control signaling.

Those skilled in the art will understand that the BS decodes the HARQ-ACK codebook based on a method corresponding to the method performed by the UE in the above-described embodiment.

Those skilled in the art will understand that various illustrative logical blocks, modules, circuits, and steps described in this application may be implemented as hardware, software, or a combination thereof. To clearly illustrate this interchangeability of hardware and software, various illustrative components, blocks, modules, circuits, and steps are generally described above in a form of function sets thereof. Whether such function sets are implemented as hardware or software depends on a specific application and design constraints imposed on the overall system. A skilled person may implement the described function sets in different manners for each specific application, but such design decisions should not be interpreted as causing a departure from the scope of this application.

These various illustrative logic blocks, modules, and circuits described in this application may be implemented or executed by general-purpose processors, Digital Signal Processors (DSPs), Application Specific Integrated Circuits (ASICs), Field Programmable Gate Arrays (FPGAs) or other programmable logic apparatuses, discrete gates or transistor logics, discrete hardware components, or any combination thereof designed to execute functions described herein. A general-purpose processor may be a microprocessor, but in an alternative scheme, the processor may be any conventional processor, controller, microcontroller, or state machine. The processor may also be implemented as a combination of computing apparatuses, such as a combination of a DSP and a microprocessor, a plurality of microprocessors, one or more microprocessors that cooperate with a DSP core, or any other such configuration.

The steps of the methods or algorithms described in this application may be directly embodied in hardware, in a software module executed by a processor, or in a combination thereof. The software module may reside in a RAM memory, a flash memory, a ROM memory, an EPROM memory, an EEPROM memory, a register, a hard disk, a removable disk, or any other form of storage medium known in the art. An exemplary storage medium is coupled to the processor so that the processor may read and write information from/to the storage medium. In an alternative scheme, the storage medium may be integrated into the processor. The processor and the storage medium may reside in an ASIC. The ASIC may reside in a user terminal. In an alternative scheme, the processor and the storage medium may reside as discrete components in a user terminal.

In one or more exemplary designs, the functions may be implemented in hardware, software, firmware, or any combination thereof. If implemented in software, respective functions may be stored on or transmitted as one or more instructions or code on a computer-readable medium. The computer-readable medium includes both a computer storage medium and a communication medium, the latter including any medium that facilitates transfer of a computer program from one place to another. The storage medium may be any available medium that may be accessed by a general purpose or special purpose computer.

The embodiments of the present application are only for easy description and help to comprehensively understand the present application, and are not intended to limit the scope of the present application. Therefore, it should be understood that, in addition to the embodiments disclosed herein, all modifications and changes or forms of modifications and changes derived from the technical idea of the present application fall within the scope of the present application.

The invention claimed is:

1. A method performed by a terminal in a wireless communication system, the method comprising:
   obtaining first configuration information for a physical downlink shared channel (PDSCH), the first configuration information including a first aggregation factor on the PDSCH;
   obtaining second configuration information for a semi-persistent scheduling, the second configuration information including a second aggregation factor on the PDSCH;
   receiving at least one PDSCH from a base station;
   determining a semi-static hybrid automatic repeat request-acknowledgement (HARQ-ACK) codebook corresponding to the at least one PDSCH based on the first aggregation factor and the second aggregation factor; and
   transmitting the semi-static HARQ-ACK codebook to the base station.

2. The method of claim 1, wherein the determining the semi-static HARQ-ACK codebook further includes determining the semi-static HARQ-ACK codebook based on a maximum value between the first aggregation factor and the second aggregation factor.

3. The method of claim 2, wherein the determining the semi-static HARQ-ACK codebook further includes determining whether at least one uplink symbol is included in a PDSCH time-domain resource associated with a row in a time-domain resource assignment table in the maximum value of slots or not.

4. The method of claim 3, wherein the determination whether the at least one uplink symbol is included in the PDSCH time-domain resource is based on time division duplex (TDD) UL-DL common configuration information or TDD UL-DL dedicated configuration information.

5. The method of claim 1, wherein the first aggregation factor and the second aggregation factor indicate a number of PDSCH slot-based repetitions.

6. A terminal in a wireless communication system, the terminal comprising:
   a transceiver; and
   a controller configured to:
      obtain first configuration information for a physical downlink shared channel (PDSCH), the first configuration information including a first aggregation factor on the PDSCH,
      obtain second configuration information for a semi-persistent scheduling, the second configuration information including a second aggregation factor on the PDSCH,
      receive at least one PDSCH from a base station,
      determine a semi-static hybrid automatic repeat request-acknowledgement (HARQ-ACK) codebook based on the first aggregation factor and the second aggregation factor, and
      transmit the semi-static HARQ-ACK codebook to the base station.

7. The terminal of claim 6, wherein the controller is further configured to determine the semi-static HARQ-ACK codebook based on a maximum value between the first aggregation factor and the second aggregation factor.

8. The terminal of claim 7, wherein the controller is further configured to determine whether at least one uplink symbol is included in a PDSCH time-domain resource associated with a row in a time-domain resource assignment table in the maximum value of slots or not.

9. The terminal of claim 8, wherein the determination whether the at least one uplink symbol is included in the PDSCH time-domain resource is based on time division duplex (TDD) UL-DL common configuration information or TDD UL-DL dedicated configuration information.

10. The terminal of claim 6, wherein the first aggregation factor and the second aggregation factor indicate a number of PDSCH slot-based repetitions.

11. A method performed by a base station in a wireless communication system, the method comprising:
    transmitting first configuration information for a physical downlink shared channel (PDSCH) to a terminal, the first configuration information including a first aggregation factor on the PDSCH;
    transmitting second configuration information for a semi-persistent scheduling to the terminal, the second configuration information including a second aggregation factor on the PDSCH;
    transmitting at least one PDSCH to the terminal; and
    receiving a semi-static hybrid automatic repeat request-acknowledgement (HARQ-ACK) codebook from the terminal,
    wherein the semi-static hybrid automatic repeat request-acknowledgement (HARQ-ACK) codebook is based on the first aggregation factor and the second aggregation factor.

12. The method of claim 11, wherein the semi-static HARQ-ACK codebook is based on a maximum value between the first aggregation factor and the second aggregation factor.

13. The method of claim 12, wherein the semi-static HARQ-ACK codebook is based on whether at least one uplink symbol is included in a PDSCH time-domain resource associated with a row in a time-domain resource assignment table in the maximum value of slots or not.

14. The method of claim 13, wherein a determination whether the at least one uplink symbol is included in the PDSCH time-domain resource is based on time division duplex (TDD) UL-DL common configuration information or TDD UL-DL dedicated configuration information.

15. The method of claim 11, wherein the first aggregation factor and the second aggregation factor indicate a number of PDSCH slot-based repetitions.

16. A base station in a wireless communication system, the base station comprising:
- a transceiver;
- a controller configured to:
    - transmit first configuration information for a physical downlink shared channel (PDSCH) to a terminal, the first configuration information including a first aggregation factor on the PDSCH;
    - transmit second configuration information for a semi-persistent scheduling to the terminal, the second configuration information including a second aggregation factor on the PDSCH; and
    - transmit at least one PDSCH to the terminal; and
    - receive a semi-static hybrid automatic repeat request-acknowledgement (HARQ-ACK) codebook from the terminal,
- wherein the semi-static hybrid automatic repeat request-acknowledgement (HARQ-ACK) codebook is based on the first aggregation factor and the second aggregation factor.

17. The base station of claim 16, wherein the semi-static HARQ-ACK codebook is based on a maximum value between the first aggregation factor and the second aggregation factor.

18. The base station of claim 17, wherein the semi-static HARQ-ACK codebook is based on whether at least one uplink symbol is included in a PDSCH time-domain resource associated with a row in a time-domain resource assignment table in the maximum value of slots or not.

19. The base station of claim 18, wherein a determination whether the at least one uplink symbol is included in the PDSCH time-domain resource is based on time division duplex (TDD) UL-DL common configuration information or TDD UL-DL dedicated configuration information.

20. The base station of claim 16, wherein the first aggregation factor and the second aggregation factor indicate a number of PDSCH slot-based repetitions.

* * * * *